United States Patent
Keidar et al.

(10) Patent No.: US 8,590,829 B2
(45) Date of Patent: Nov. 26, 2013

(54) SYSTEM, FLOATING UNIT AND METHOD FOR ELEVATING PAYLOADS

(75) Inventors: Ronen Keidar, Yokneam Moshava (IL); Shay Cohen, Yokneam Moshava (IL)

(73) Assignee: Sky Sapience Ltd., Yokneam, IL (US)

( * ) Notice: Subject to any disclaimer, the term of this patent is extended or adjusted under 35 U.S.C. 154(b) by 51 days.

(21) Appl. No.: 13/263,080

(22) PCT Filed: Apr. 6, 2010

(86) PCT No.: PCT/IL2010/000273
§ 371 (c)(1),
(2), (4) Date: Jan. 2, 2012

(87) PCT Pub. No.: WO2010/116362
PCT Pub. Date: Oct. 14, 2010

(65) Prior Publication Data
US 2012/0091258 A1    Apr. 19, 2012

Related U.S. Application Data

(60) Provisional application No. 61/166,820, filed on Apr. 6, 2009.

(51) Int. Cl.
*B64C 27/00* (2006.01)
*B64C 29/00* (2006.01)
*B64D 35/00* (2006.01)
*G01C 19/06* (2006.01)

(52) U.S. Cl.
USPC ....... 244/23 R; 244/63; 244/17.11; 244/23 A; 244/23 C; 244/60; 74/5 F; 74/5 R

(58) Field of Classification Search
USPC ............ 244/63, 17.11, 23 R, 23 A, 23 C, 60; 74/5.2, 5 R, 5 F, 5.8
See application file for complete search history.

(56) References Cited

U.S. PATENT DOCUMENTS

| | | | | |
|---|---|---|---|---|
| 4,486,669 A | * | 12/1984 | Pugh | 290/44 |
| 4,795,111 A | * | 1/1989 | Moller | 244/23 C |
| 5,295,643 A | * | 3/1994 | Ebbert et al. | 244/7 B |
| 7,675,189 B2 | * | 3/2010 | Grenier | 290/54 |
| 8,350,403 B2 | * | 1/2013 | Carroll | 290/55 |
| 2010/0295303 A1 | * | 11/2010 | Lind et al. | 290/44 |
| 2011/0180671 A1 | * | 7/2011 | Campbell et al. | 244/23 D |

* cited by examiner

*Primary Examiner* — Tien Dinh
*Assistant Examiner* — Michael Wang
(74) *Attorney, Agent, or Firm* — Oren Reches

(57) ABSTRACT

A method, system and a floating unit. The floating unit includes a propeller, a frame, a propeller motor that is configured to rotate the propeller about a first axis; wherein the propeller motor is coupled to the frame, a movable steering element; a controller, for controlling at least one of the propeller motor and the movable steering unit to affect at least one of a location and an orientation of the floating unit; and an interfacing module for coupling a payload to the floating unit and for receiving power from a connecting element that couples the floating unit to a ground unit; wherein the power received by the power interface is utilized to power the propeller motor and the controller.

44 Claims, 21 Drawing Sheets

Receiving power from a connecting element that connects a floating unit to a ground unit. 1710

Distributing the power received by the power interface to a propeller motor of the floating unit and to a controller of the floating unit. 1720

Rotating a propeller of the floating unit about a first axis, by the propeller motor. 1730

Controlling, by the controller, at least one movable steering element out of the propeller motor and the movable steering unit to affect at least one of a location and an orientation of the floating unit. 1740

Sensing an orientation of the floating unit, 1750

Receiving orientation and/or location commands from a ground unit. 1760

Introducing, by an interfacing module of the floating unit, an angular deviation between an upper portion of a tensed flexible cable and the first axis. 1770

Increasing an effective length of a connecting element that connects a floating unit to a ground unit while a propeller motor of the floating unit rotates a propeller of the floating unit; wherein the effective length of the connecting element determines a distance between the floating unit and the ground unit. 1810

Supplying power to the floating unit via the connecting element, while the floating element is in the air. 1820

Reducing the effective length of the connecting element while the propeller motor of the floating unit rotates the propeller of the floating unit. 1830

SYSTEM, FLOATING UNIT AND METHOD FOR ELEVATING PAYLOADS

RELATED APPLICATIONS

This application claims the benefit of U.S. provisional patent Ser. No. 61/166,820 filing date Apr. 6, 2010 which is incorporated herein in its entirety.

FIELD OF THE INVENTION

The invention relates to systems, floating units and method for elevating payloads by the floating unit.

BACKGROUND OF THE INVENTION

Prior art of height observation and, signaling equipment (such as observation cameras) are connected to a base unit by using a mast made of rigid metal construction or other stiff materials that supports the equipment.

The mast implements large moments on the base due to its significant height. For example, every single Kg force of wind pressure at the top of a 30 meter height mast will implement a moment of about 30 Kg at one meter on the platform, and a pressure of about 150 Kg on a typical 20 cm diameter base construction. Thus, a heavy duty vehicle is required to support the equipment with its supporting construction.

In addition, the process of lifting the equipment to the destined altitude is time consuming and requires a team work. Tactic balloons and masts suffer from long spreading time, long folding time, large size (about 1 cubic meter of Helium for 300 gram of payload and balloon), bad stability and require highly trained operators.

There is a need for a simpler system and method for lifting equipment for height observation or signaling such as an observation camera.

SUMMARY OF THE INVENTION

A floating unit is provided. The floating unit may include a propeller; a frame; a propeller motor that may be configured to rotate the propeller about a first axis; wherein the propeller motor may be connected to the frame; a movable steering element; a controller, for controlling at least one of the propeller motor and the movable steering unit to affect at least one of a location and an orientation of the floating unit; and an interfacing module for coupling a payload to the floating unit and for receiving power from a connecting element that couples the floating unit to a ground unit; wherein the power received by the power interface may be utilized to power the propeller motor and the controller.

The connecting element may be a flexible cable, that may be maintained in a tensed status while the floating unit is in the air.

The propeller motor may be configured to rotate the propeller at a fixed speed. The floating unit may include at least one fixed steering element for preventing a rotation of the floating unit about the first axis as a result of a rotation of the propeller at the fixed speed.

The floating unit may include at least one fixed steering element for reducing a rotation of the floating unit about the first axis as a result of a rotation of the propeller.

The frame may include a propeller motor support element and multiple fixed steering elements that connect the propeller motor support element to an annular housing of the floating unit.

The interfacing module may be configured to introduce an angular deviation between an upper portion of the connecting element and the first axis.

The interfacing module may include a circular joint connected between the upper portion of the connecting element and the frame; and at least one interfacing module motor; and interfacing elements, for converting at least one movement of the at least one interfacing module motor to a relative movement between the upper portion of the connecting element and the frame.

The interfacing module may include a lower end that interfaces the connecting element, a housing that may be shaped to be connected to the payload and an upper end that may include the at least one interfacing module motor.

The annular housing may be surrounded by or made of a thermal signature (and/or electromagnetic radiation signature) reduction material.

The floating unit may include multiple movable steering elements that extend from a central region of the floating unit towards the annular structural element.

The multiple movable steering elements extend towards the annular structural element in a radial manner.

At least one movable steering element may be connected to an inner portion of the annular housing.

The interfacing module may include a payload interfacing module for coupling the payload to the floating unit and a connecting element interfacing module for receiving power from the connecting element.

The payload interfacing module may be positioned below the propeller motor.

The payload interfacing module may be positioned above the propeller.

The movable steering element may be movable by a steering element motor that may be located outside the annular housing.

The frame may be a first frame and wherein the floating unit may further include a second frame; wherein the first frame may be connected to the propeller and to the propeller motor; wherein the second frame may be connected to the interfacing module; and wherein the first frame and the second frame are connected to each other via a frame connecting module that facilitates a relative movement between the first and second frames.

The floating unit may include an orientation sensor for sensing an orientation of the floating unit.

The movable steering element may be configured to be controlled by the controller, for compensating for fast changes in a location or of an orientation of the floating unit.

The controller may be configured to position the movable steering element at an initial position for preventing the floating element from rotating about a floating unit axis as a result of a rotation of the propeller at a fixed speed; wherein the controller may be further configured to move the movable steering element about the initial position for compensating for fast changes in a location or of an orientation of the floating unit.

A system is provided. The system may include: (i) a connecting element; (ii) a ground unit, that may include a power source for providing power to the flexible cable; a connecting element manipulator, for altering an effective length of the connecting element; wherein the effective length of the connecting element defines a distance between the ground unit and a floating unit of the device; a ground unit controller for controlling the connecting element manipulator; and (iii) a floating unit, the floating unit may include a propeller; a frame; a propeller motor that may be configured to rotate the propeller about a first axis; wherein the propeller motor may be connected to the frame; a movable steering element; a controller, for controlling at least one of the propeller motor and the movable steering unit to affect at least one of a location and an orientation of the floating unit; and an interfacing module for coupling a payload to the floating unit and for receiving power from the connecting element; wherein the power received by the power interface may be utilized to power the propeller motor and the controller.

The connecting element may be a flexible cable and wherein the connecting element manipulator may be configured to wind up and wind out the flexible cable; wherein while the floating unit may be in the air the flexible cable may be maintained in a tensed status.

The connecting element manipulator may be configured to perform a sequence of winding up and winding out operations that result in changes in an effective length of the flexible cable; wherein the changes in length are a fraction of the effective length of the flexible cable.

The flexible cable may be connected to the flexible cable interface by a shock constraining element.

The flexible cable has a wing cross section.

The propeller motor may be configured to rotate the propeller while the floating unit may be being winded up.

The propeller motor may be configured to rotate the propeller at a fixed speed during the winding up and the winding out of the flexible cable.

The propeller motor may be configured to reduce a rotational speed of the propeller during a winding up the flexible cable.

The propeller motor may be configured to alter a rotational speed of the propeller based on the effective length of the flexible cable.

The ground unit may be mounted to a vehicle.

A floating unit is provided. It may include a frame; a propeller; a propeller motor that is connected to the frame and is configured to rotate the propeller at a fixed speed about a first axis; a payload interfacing module, for coupling a payload to the floating unit; a controller; at least one fixed steering element for preventing the floating element from rotating about the first axis as a result of a rotation of the propeller at the fixed speed; at least one movable steering element, controlled by the controller, for compensating for fast changes in a location or in a orientation of the floating unit; and a cable interface for receiving power from a tensed flexible cable that couples the floating unit to a ground unit; wherein the power received by the power interface is utilized to power the propeller motor and the controller.

A floating unit is provided. It may include a propeller; a propeller motor that is configured to rotate the propeller; wherein the propeller motor receives power generated by a ground unit; a payload interface, for coupling a payload to the floating unit; a movable steering element; a controller, for controlling the movable steering unit and for controlling the propeller motor; and a cable interfacing module for introducing a angular deviation between an upper portion of a tensed flexible cable and the first axis; wherein the tensed flexible cable couples the floating unit to a ground unit.

A method for operating a floating unit is provided. The method may include receiving power from a connecting element that couples the floating unit to a ground unit; distributing the power received by the power interface to a propeller motor of the floating unit and to a controller of the floating unit; rotating a propeller of the floating unit about a first axis, by the propeller motor; and controlling, by the controller, at least one movable steering element out of the propeller motor and the movable steering unit to affect at least one of a location and an orientation of the floating unit.

The method may include sensing an orientation of the floating unit and controlling the at least one movable steering element in response to the orientation of the floating unit.

The method may include controlling the at least one movable steering element in response to a floating unit anti rotation affect introduced by a fixed steering element of the floating unit.

The method may include introducing, by an interfacing module of the floating unit, an angular deviation between an upper portion of a tensed flexible cable and the first axis.

The method may include controlling the movable steering element for compensating for fast changes in a location or of an orientation of the floating unit.

The method may include positioning the movable steering element at an initial position for preventing the floating element from rotating about the first axis as a result of a rotation of the propeller at a fixed speed and controlling the movable steering element about the initial position for compensating for fast changes in a location or of an orientation of the floating unit.

The connecting element is a flexible cable that is maintained in a tensed position while the floating unit is in the air.

The method may include rotating the propeller while the flexible cable is being winded up.

The method may include rotating the propeller at a fixed rotational speed, while the flexible cable is being winded up and while the tensed flexible cable is being winded out.

The method may include reducing a rotational speed of the propeller during a winding up the flexible cable.

The method may include altering a rotational speed of the propeller based on an proximity of the floating unit to the ground unit.

A method is provided. The method may include increasing an effective length of a connecting element that connects a floating unit to a ground unit while a propeller motor of the floating unit rotates a propeller of the floating unit; wherein the effective length of the connecting element determines a distance between the floating unit and the ground unit; supplying power to the floating unit via the connecting element, while the floating element is in the air; and reducing the effective length of the connecting element while the propeller motor of the floating unit rotates the propeller of the floating unit.

The connecting element may be a flexible cable and the increasing may include winding out the flexible cable while a propeller motor of the floating unit rotates a propeller of the floating unit. The decreasing may include winding up the flexible cable while the propeller motor of the floating unit rotates the propeller of the floating unit.

The method may include performing a sequence of winding up and winding out operations that result in changes in a length of a released portion of the flexible cable; wherein the changes in length are a fraction of the length of the released portion of the flexible cable.

A floating unit is provided. The floating unit may include a first propeller; a first frame; a second frame; a counter rotating element; a rotation inducing module that is configured to rotate the propeller about a first axis at a first direction and to rotate the counter rotating element at a second direction that is opposite to the first direction; wherein the rotation inducing module is connected to the first frame; a movable steering element connected to the second frame; a controller, for controlling at least one of the rotation inducing module and the movable steering unit to affect at least one of a location and an orientation of the floating unit; an interfacing module, connected to the second, frame, for coupling a payload to the floating unit and for receiving power from a connecting element that couples the floating unit to a ground unit; wherein the power received by the power interface is utilized to power the propeller motor and the controller; and a frame connecting module that facilitates a relative movement between the first and second frames.

The floating unit may include a fixed steering element, connected to the rotation inducing module, for reducing a rotation of the first frame about the first axis.

The counter rotating element may be a propeller.

The frame connecting module facilitates a relative movement between the first and second frames along two axes that are oriented in relation to the first axes. It may be orthogonal to the first axis.

BRIEF DESCRIPTION OF THE DRAWINGS

Further features and advantages of the invention will be apparent from the description below. The invention is herein described, by way of example only, with reference to the accompanying drawings, wherein:

FIGS. 17-18 illustrate various methods according to various embodiments of the invention.

DETAILED DESCRIPTION OF THE DRAWINGS

Figure 1:
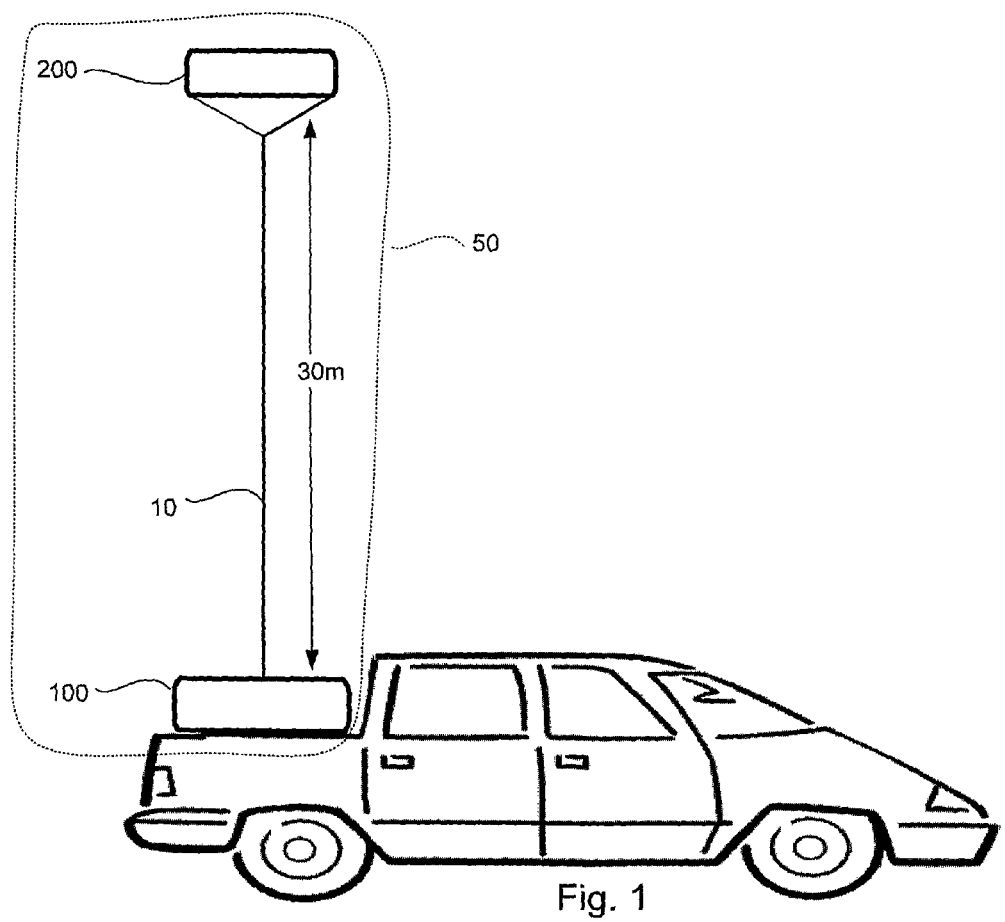
FIG. 1 is a general view of a system according to an embodiment of the invention.

A system (also referred to as Hover Mast system) is provided. The system may be used for height spreading of observation, signaling equipment, antennas, transmission relay station, anti-terrorist surveillance, and the like. The system may be a light, compact and portable and may include a ground unit and a floating unit. The floating unit orientation and location (displacement) may be controlled within four degrees of freedom while maintaining a built-in stability thereof. The system may be automatically and easily deployed and folded.

Various applications can use the system, for example: observation, height photographing, a reception/transmission relay, spot marking (by a projector or laser), antennas etc.

A system is provided. It may include:
(i) a connecting element;
(ii) a ground unit, the ground unit may include:
   a. a power source for providing power to the flexible cable;
   b. a connecting element manipulator, for altering an effective length of the connecting element; wherein the effective length of the connecting element defines a distance between the ground unit and a floating unit of the system; and c. a ground unit controller for controlling the connecting element manipulator; and
(iii) a floating unit, the floating unit may include:
   a. a propeller;
   b. a frame;
   c. a propeller motor that is configured to rotate the propeller about a first axis; wherein the propeller motor is connected to the frame;
   d. movable steering element;
   e. a controller, for controlling at least one of the propeller motor and the movable steering unit to affect at least one of a location and an orientation of the floating unit; and
   f. an interfacing module for coupling a payload to the floating unit and for receiving power from the connecting element; wherein the power received by the power interface is utilized to power the propeller motor and the controller.

The floating unit may be connected to the ground unit via a connecting element that may be a flexible cable. The flexible cable may be kept tensed when the floating unit is in the air or at least during a portion of a floating period of the floating unit. The flexible cable is tensed in the sense that is applies a force on the floating unit. The force may significant in the sense that the floating unit may maneuver in relation to the flexible cable. The connecting element may differ from a flexible cable. For example it may be connected of multiple links that are loosely or pivotally connected to each other.

A floating unit is provided. It may include:
i. a propeller;
ii. a frame;
iii. a propeller motor that is configured to rotate the propeller about a first axis; wherein the propeller motor is connected to the frame;
iv. a movable steering element;
v. a controller, for controlling at least one of the propeller motor and the movable steering unit to affect at least one of a location and an orientation of the floating unit; and
vi. an interfacing module for coupling a payload to the floating unit and for receiving power from a connecting element that couples the floating unit to a ground unit; wherein the power received by the power interface is utilized to power the propeller motor and the controller.

The power provided to the floating unit can also be utilized for powering the payload.

FIG. 1 illustrates a system 50 according to an embodiment of the invention.

FIG. 1 illustrates system 50 as including ground unit 100, that is positioned on a vehicle such as a van and floating unit 200 that holds a payload (such as one or more types of equipment) and can lift itself to heights of about thirty meters within approximately ten seconds. It is noted that the floating unit 200 can lift the equipment to heights that differ from thirty meters and during a period that differs than ten seconds.

Ground unit 100 is connected to floating unit 200 by a connecting element such as flexible cable 10. Flexible cable 10 may include an electrical cable and a communication cable. Both cables may be wrapped by or otherwise surrounded by flexible cable 10 that provides a mechanical connectivity between ground unit 100 and floating unit 200.

Figure 3:
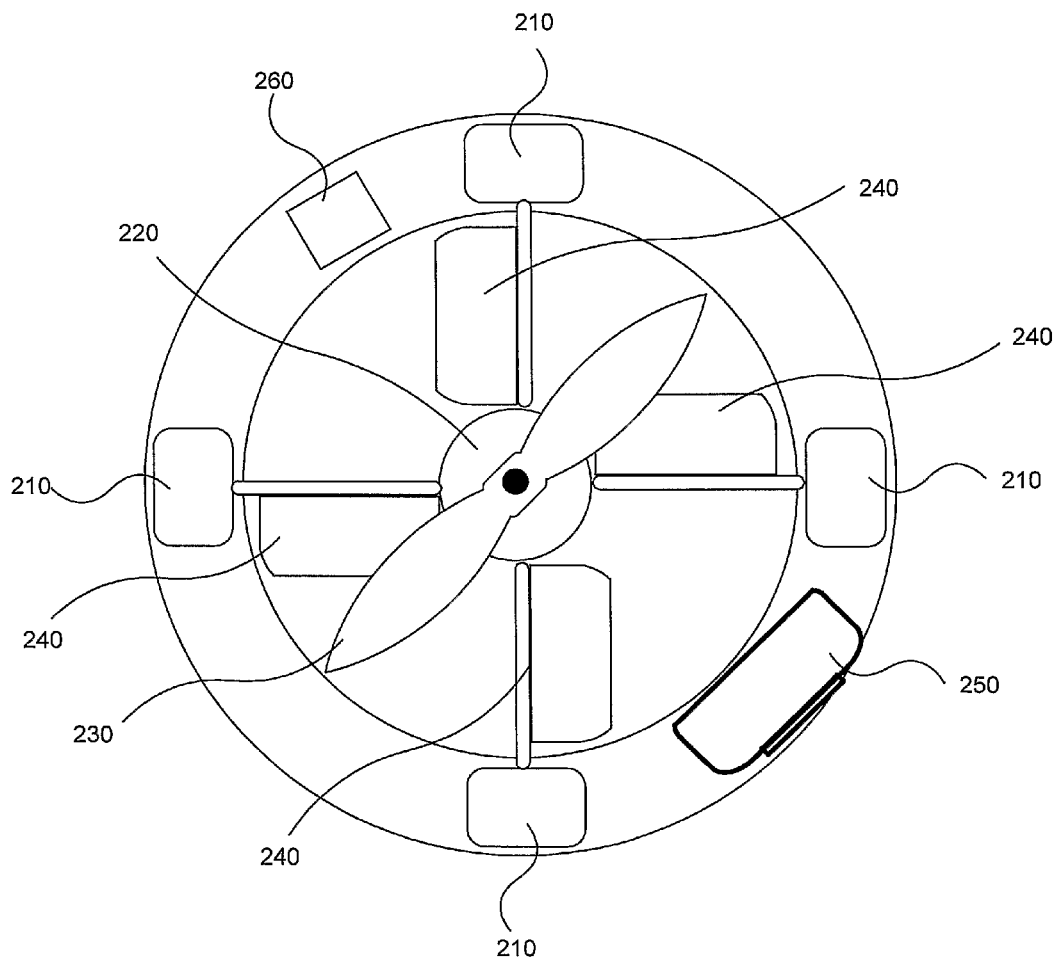
FIG. 3 is a top view of a floating unit of the system according to an embodiment of the invention.

The system 50 does not require a physical support for floating unit 200 that performs the observation from the heights, since the floating unit 200 supports itself, as described in FIG. 3. Thus—flexible cable 10 can be light weighted since it doesn't need to support floating unit 200.

Flexible cable 10 is expected to physically tie and secure floating unit 200 and electrically connect ground unit 100 and floating unit 200 for power supply and communication. Floating unit 200 and flexible cable 10 do not require a special vehicle for support, as any van or relatively light vehicle can be adequate. Lighter versions of system 50 can even be carried by a person and even installed inside a backpack.

Flexible cable 10 (once fully released) may be of 30 m length in order to get a good observation but other lengths may be used too. The average lifting and landing time of floating unit 200 is around 10 seconds. Floating unit 200 may be configured to hold a payload of 1 to 5 kilos (although heavier or lighter payloads may be lifted by floating unit 200), may have a low heat emission and may barely generate noise. It is noted that flexible cables of other lengths may be used.

Figure 2:
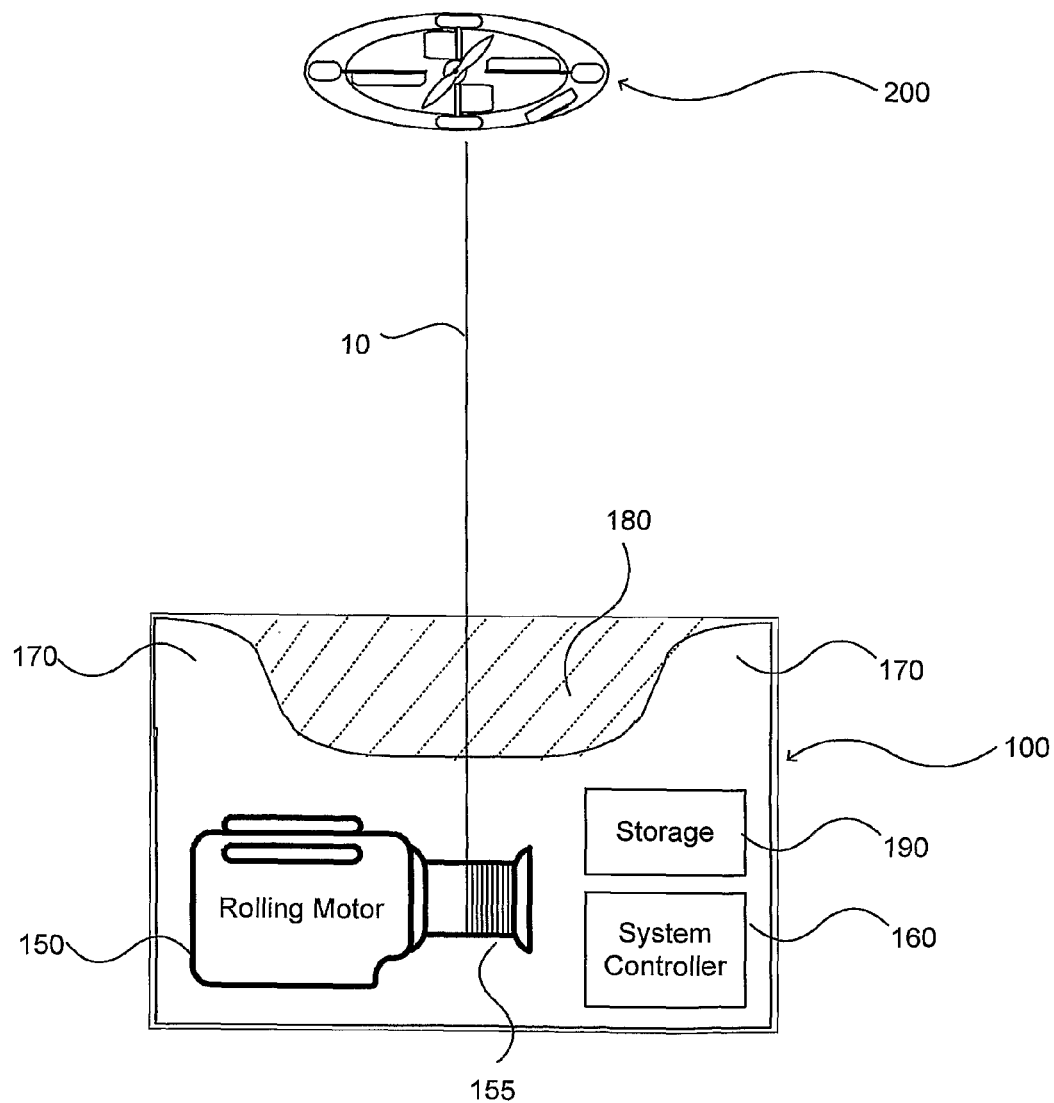
FIG. 2 illustrates a ground unit of the system according to an embodiment of the invention.

FIG. 2 illustrates system 50 that includes ground unit 100 and floating unit 200 according to an embodiment of the invention.

The ground unit 100 may include a connecting element manipulator that may be configured to wind up and wind out flexible cable 10. While floating unit 200 is in the air the flexible cable 10 is maintained in a tensed status. It applies a force that should be overcome by propeller 302 of floating unit 200.

Ground unit 100 may include a connecting element manipulator such as a winch, that includes rolling cylinder 155 and rolling motor 150. The rolling cylinder 155 may bind the flexible cable 10 and is connected to a rolling motor 150. Rolling motor 150 rotates rolling cylinder 155 in order to release (wind out) flexible cable 10 and rotates rolling cylinder 155 at an opposite direction in order to bind (wind up) flexible cable 10 around rolling cylinder 155.

A ground unit controller such as system controller 160 is connected to rolling motor 150 and instructs rolling motor 150 to rotate clockwise or anticlockwise in order to release or bind flexible cable 10. Conveniently, the instruction can include the speed and even the acceleration of the rotation.

Conveniently, system controller 160 may control floating unit 200 by using a wired communication line, in this case flexible cable 10 wraps one or more communication cable.

Additionally or alternatively, system controller 160 may also communicate with floating unit 200 by using a wireless communication, such as an RF based wireless communication system.

System controller 160 may instruct floating unit 200 to change the observation angle, to change its inclination angle, to start a lifting process and landing. System controller 160 can instruct ground unit 100 to change the altitude of floating unit 200 by operating the rolling motor 150.

In case floating unit 200 carries an observation camera, system controller 160 receives the images acquired by floating unit 200, through the communication cable that is wrapped within flexible cable 10.

System controller 160 sends the images via a communication (not shown) to a remote or local external system that collects images from at least one Hover Mast system 50. Conveniently, system controller 160 stores the images in storage 190 for later retrieval. Alternately, it can send the images to a display (not shown) connected to ground unit 100.

Funnel 170 is used for the reception of the floating unit 200 during the final stage of landing. Cavity 180 is reserved for storing floating unit 200 while it is shut down.

Conveniently, ground unit 100 includes a display for displaying images acquired by the camera and displaying floating parameters and status of floating unit 200. Alternately, the images can be displayed on a display of the external system.

Conveniently, ground unit 100 includes input means to allow the user to start lifting and landing processes and to control the observation angle and inclination of floating unit 200 (4 degrees of freedom) while it is on air. The input means may include push buttons, joystick or using a menu from the display.

Ground unit 100 also includes a power supply 130 that supplies power to ground unit 100 as well as to floating unit 200 by using the electrical cable within flexible cable 10.

In order to prevent floating unit 200 to resonant at least one of the following measures may be applied: (i) the connecting element manipulator, may perform a sequence of winding up and winding out operations that result in changes in an effective length of the flexible cable; wherein the changes in length are relatively minor—they may be a fraction of the effective length of the flexible cable; (ii) flexible cable 10 may be connected to the flexible cable interface by a shock constraining element in order to reduce mechanical shocks that may result in self resonance.

Flexible cable 10 may have a circular cross section or any other aerodynamic shape. For example, flexible cable 10 may have a wing cross section.

Figure 4:
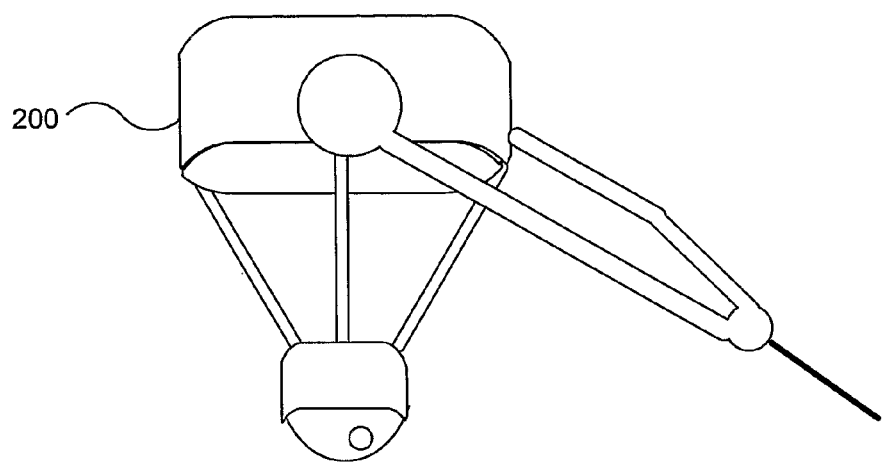
FIGS. 4 and 5 illustrate a stabilization and angular control of the floating unit according to an embodiment of the invention.

Floating unit 200 is illustrated in FIG. 3, and has the shape of a double wall cylinder. The inner space between the cylinder walls can include (or at least partially include) payload that is supported by the floating unit 200. The payload may include one or more types of equipment such as but not limited to a camera, a reception/transmission unit, a signaler, a laser marker. Payload may be also mounting on the floating unit 200 elsewhere as shown in FIG. 4.

Floating unit 200 may include:
i. Propeller 230 that lifts floating unit 200.
ii. Propeller motor 220, pivotally connected to propeller 230 and configured to rotate the propeller 230 about a first axis.
iii. At least one movable steering element such as multiple steering fins 240 that are used for stabilizing floating unit 200 by balancing the air whirl caused by the propeller and help changing the angle of floating unit 200. Four steering fins 240 are illustrated in FIG. 3, but any number of fins, greater than 1, can be implemented.
iv. Multiple fin motors 210, each is connected to one of the multiple steering fins 240 and control its opening angle with reference to the plane of propeller 230.
v. Payload such as camera 250 that is used for acquiring images (can be any other observation, antenna or signaling equipment). The camera is connected via an interface (not shown).
vi. A controller such as floating unit controller 260 that controls the operation of propeller motor 220 by instructing it to start, pause and change it angular velocity and also controls the operation of multiple fin motors 210 by instructing them to change the opening angle. The acquired images will be sent to ground unit 100 by the camera or by a central communication electronic handler (not shown).
vii. An interface (not shown) for being connected to the flexible cable 10 and for receiving power from the flexible cable 10.

Floating unit controller 260 may receive commands from system controller 160 (examples: change observation angle, change inclination angle, lift and land). The communication channel for commands and images transfer between floating unit controller 260 and system controller 160 is using either a communication cable within flexible cable 10 or a wireless communication channel. Another option is to use the electrical cable for communication transferring.

Floating unit 200 receives its power supply via an electrical cable that is wrapped within flexible cable 10, thus eliminating the need to use, its own power supply and eliminate the extra weight.

Figure 5:
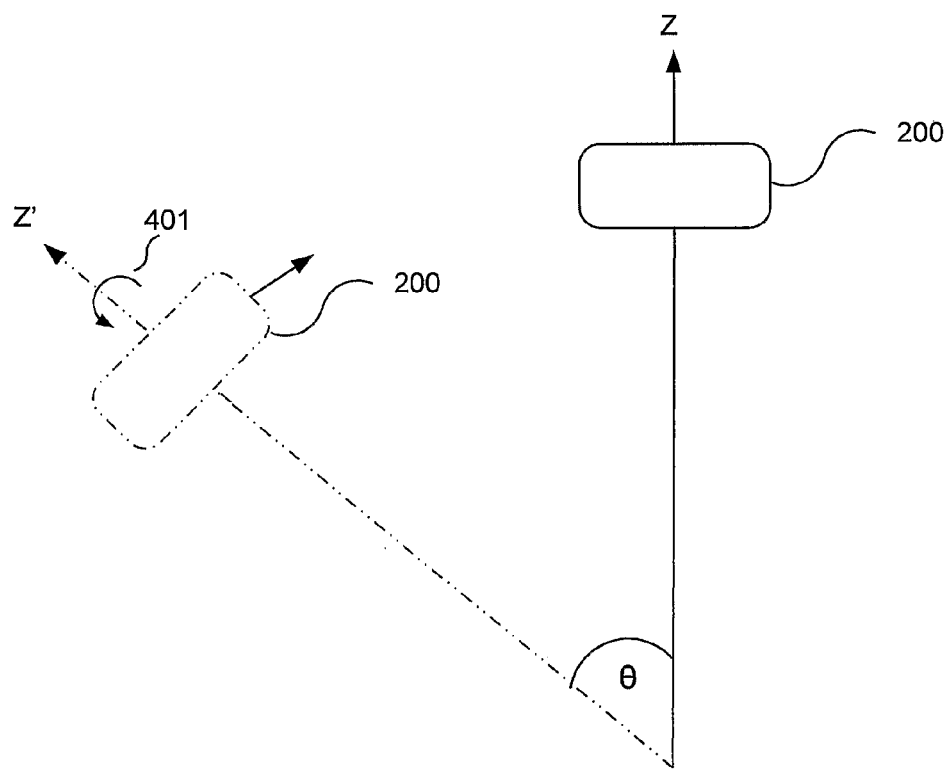

FIG. 4 illustrates a possible solution for stabilizing the floating unit using the gravity force. The flexible cable 10 is connected to an interface that is pivotally connected to floating unit 200. FIG. 5 shows θ angle that can be reduce using the gravity force or by advanced sensing and electronic stabilization system using the fins. FIG. 5 also shows the rotation of the camera angle option.

Floating unit 200 can be slightly displaced from its original position (above ground unit 100) by causing flexible cable 10 to form small angle θ with its original position—an imaginary normal that rises from ground unit 100 (perpendicular to the ground). This displacement is achieved by changing the opening angle of at least one of steering fins 240.

Floating unit 200 can also rotate around Z-axis as shown by arrow 401, again by changing the opening angle of at least one of steering fins 240, thus changing the point of view of the camera.

Changes of altitude can be also provided during the floating, by binding flexible cable 10.

Figure 6:
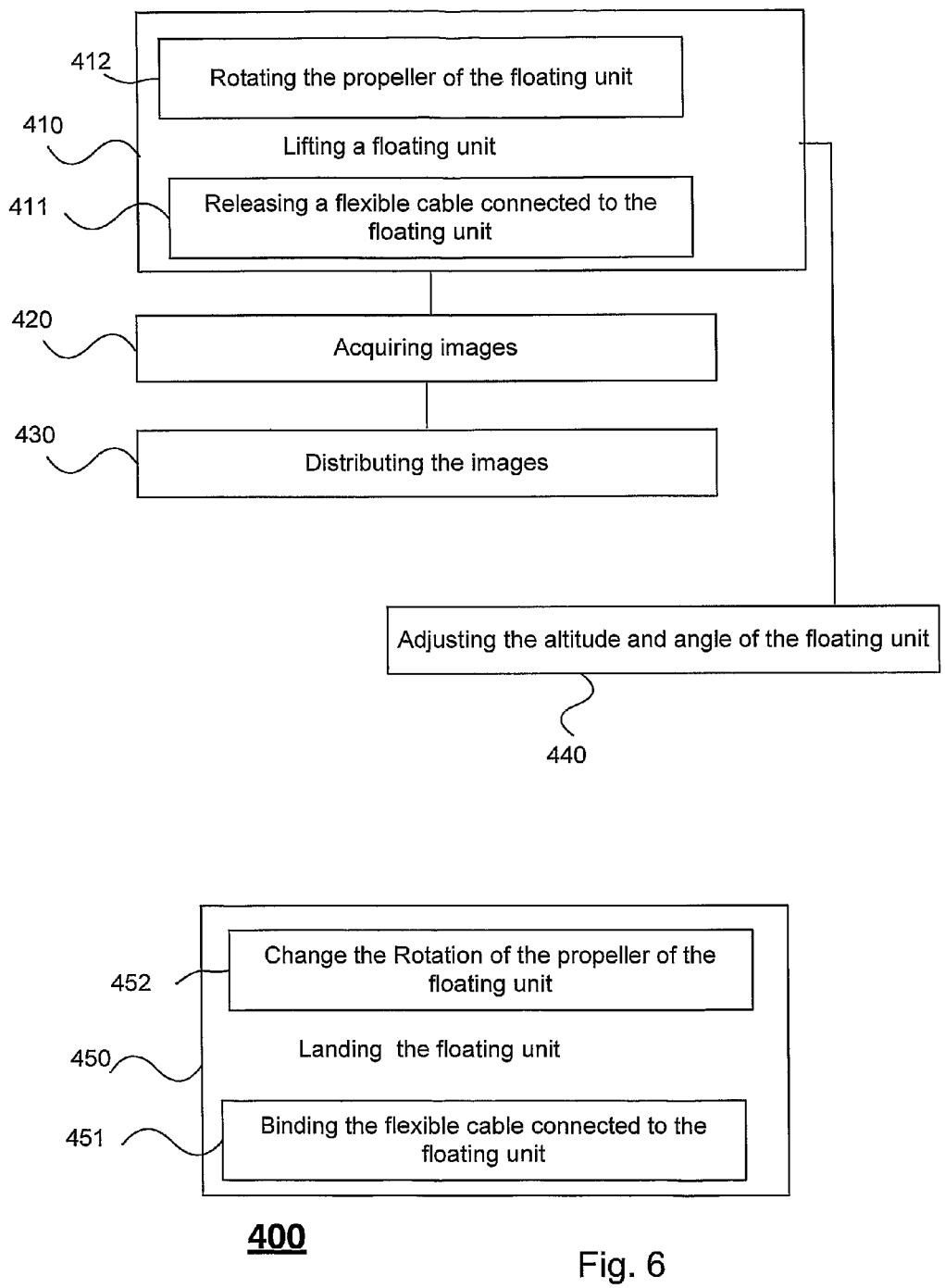
FIG. 6 illustrates a method of operating the system.

FIG. 6 illustrates method 400 of operating system 50 according to an embodiment of the invention.

Method 400 may start with stage 410 of lifting floating unit 200 (that is initially situated within cavity 180 of ground unit 100). The lifting is substantially vertical to the ground and is limited by the length of flexible cable 10. Stage 410 includes stage 411 of releasing flexible cable 10 by rolling motor 150 of ground unit 100. Stage 410 also includes stage 412 of rotating the propeller of floating unit 200 by propeller motor 220 of floating unit 200. Stage 412 can start before stage 411.

Stages 411 and 412 are performed in cooperation with each other and are being controlled by system controller 160.

The stabilization of floating unit 200, during the lifting, is controlled by steering fins 240. The speed of the lifting is restricted by rolling motor 150 that releases flexible cable 10.

Stage 410 ends when floating unit 200 reaches the desired height which is limited by the size of flexible cable 10.

Stage 410 is followed by stages 420, 430 and 440 while floating unit 200 is floating in the air and after the target height is reached.

Stages 420 and 430 will take place, in case the assignment of Hover Mast system 50 is height photographing.

Stage 420 of acquiring images is being handled by camera 250 that transfer the acquired images to ground unit 100.

Stage 430 of distributing the acquired images can start after at least one image is acquired and continues simultaneously with stage 420 that continues to acquire additional images.

The distributing can include sending, by camera 250, the images to system controller 160 by using either a communication cable that is within flexible cable 10 or by using a wireless communication. The distributing can include sending the images via a central communication electronic handler that is installed in floating unit 200 and not directly from the camera.

Stage 430 can include receiving, by the system controller 160, the images. Stage 430 can be followed by at least one of the following: (i) storing the images in storage 190; (ii) displaying the images to a local user; and (iii) sending the images to a central system that may be connected to multiple Hover Mast systems.

Stages 420 and 430 provide a non limiting example of a manner in which a payload that is carried by floating unit 200 may be utilized. It is noted that other utilization may be performed and may include, for example, receiving signals, transmitting signals, marking targets, and the like.

Stage 440 of adjusting the altitude and angle of floating unit 200 can be performed simultaneously with either stage 420 or 430.

Stage 440 can be controlled by a user command (push button, joystick or via the display) wishing to change the altitude or angles of floating unit 200, in order to scan the area or it can be controlled unsolicited by floating unit controller 260 as a result of samples read from sensors and as part of an automatic stabilization process. Different sensors can be used in order to provide an automatic indication of the system positioning/status, sensors such as: accelerometers, gyro, GPS/DGPS, embedded vision module, etc.

Stage 440 can involve, changing the opening angle of multiple steering fins 240 (which is done by multiple fin motors 210) and possible changing the position of rolling cylinder 155 for achieving height control (which can be done by rolling motor 150).

Stage 440 can apply changes in the altitude of floating unit 200 by binding flexible cable 10 and applying slight changes in the position of floating unit 200 by changing angle θ between flexible cable 10 and an imaginary vertical axis that rises from the location of ground unit 100.

Changing the position and angle of floating unit 200 can be useful for acquiring images from different angles that can be used for building a 3D image of the terrain, for triangulation, super-resolution techniques, and etc. Changing the position and angle of floating unit 200 is also useful for avoid obstacles blocking the sight of the camera.

Stage 450 of landing of floating unit 200 starts by a user command (such as push a button or a command via the display) and is following either stages 420,430 and 440.

Stage 450 includes stages 451 and 452. Stage 451 includes binding flexible cable 10 by rolling motor 150 of ground unit 100 and stage 452 includes keeping floating unit 200 stabilized while landing. This stage might involve changing the angular velocity of rotating propeller 230 of floating unit 200. This can be done by propeller motor 220 of floating unit 200. Stages 451 and 452 can be performed in cooperation and can be controlled by system controller 160.

When floating unit 200 reaches the threshold of ground unit 100 it is funneled by funnel 170 of ground unit 100 into cavity 180 that stores it. Propeller 230 and steering fins 240 are halted.

According to an embodiment of the invention movements of floating unit 200 movements can be evaluated by utilizing one or more cameras.

Figure 7:
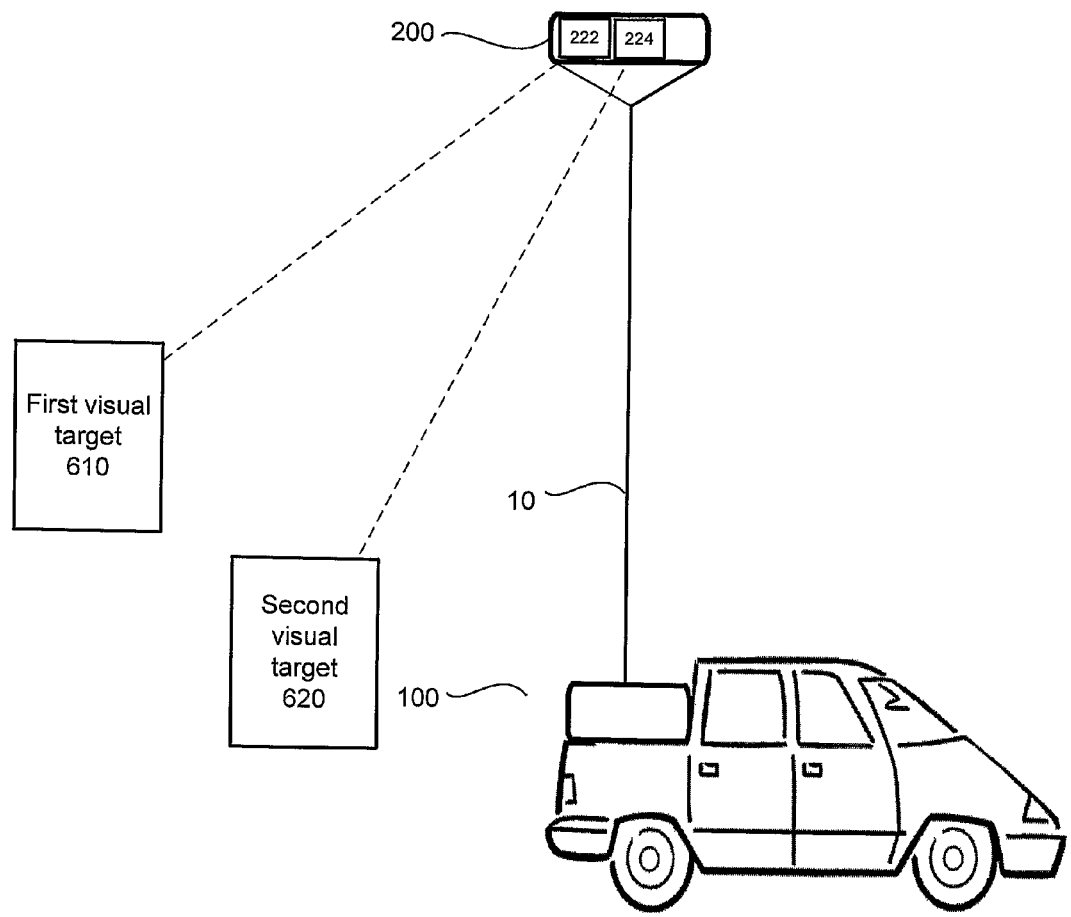
FIG. 7 illustrates a system and its environment according to another embodiment of the invention.

One or more fast cameras can be installed on the floating unit 200 and each camera can pointed to a visual stabilization target that is formed on a static object in respect of ground unit 100. For example, FIG. 7 illustrates cameras 222 and 224 that are pointed to visual targets 610 and 620. Each camera is directed towards a single visual target.

If ground unit 100 is static then the detection process can be simplified. For example, any object can be used as a stabilization target. A searching algorithm can be applied in order to identify and select automatically the best object to serve as a stabilization target.

Each camera acquires a sequence of images. These image sequences can be processed and a real time tracking algorithm can be applied to track the stabilization target and calculate any movement of the floating unit 200 in one till six degrees of freedom (such as: tilt, yaw, any linear shifts, etc.).

The tracking can be followed by stabilizing floating unit 200. This can include receiving sending stabilizing information generated by a DSP or by other control hardware, for stabilizing floating unit 200 or any optional equipment that is install on floating unit 200.

Figure 8:
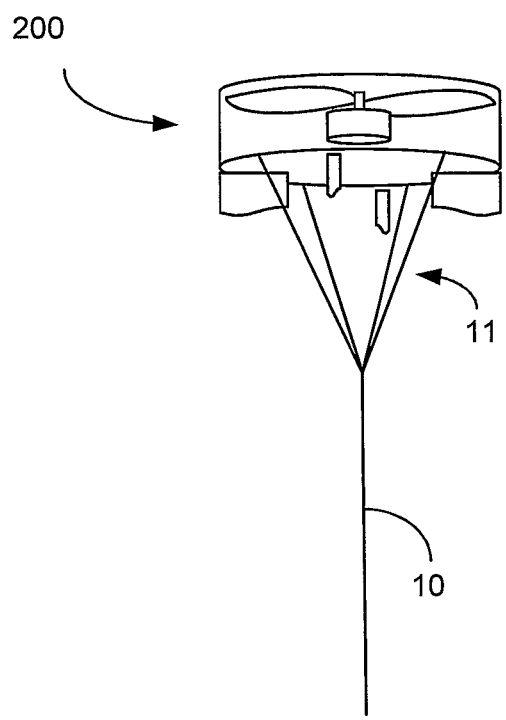
FIGS. 8 and 9 illustrate a floating unit and a connecting element, according to various embodiments of the invention.
Figure 9:
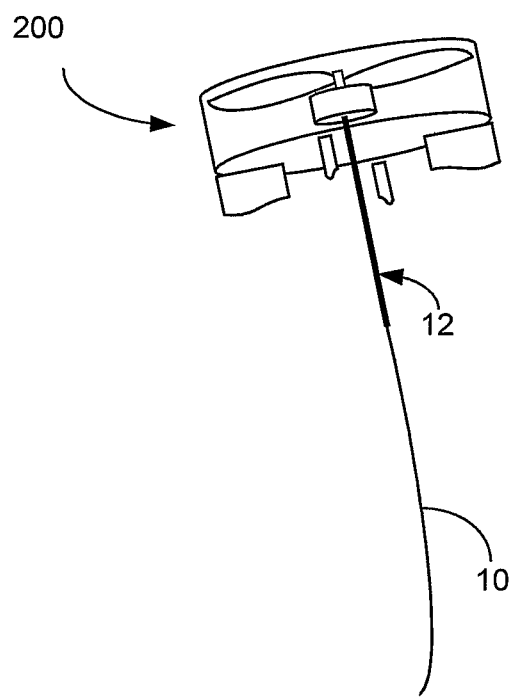

According to an embodiment of the invention the flexible cable 10 is connected to the floating unit 200 at one or more points. FIG. 8 illustrates a flexible cable 10 that is ends by four different threads 11 that are connected to the floating unit 200 at four different points. FIG. 9 illustrates a flexible cable 10 that ends with a rigid portion 12 that is connected to the floating unit. FIGS. 10, 12, 13 and 14 illustrate floating unit 200 as being connected to an upper end of flexible cable 10 at a single point.

FIGS. 10-14 illustrate various configurations of floating unit 300 according to various embodiments of the invention.

FIGS. 10-14 illustrate payload interlacing module 314 that is positioned below propeller motor 306, while FIG. 3 illustrates a payload (such as camera 250) that is located above the annular housing (that may be above the propeller motor 306).

Figure 10:
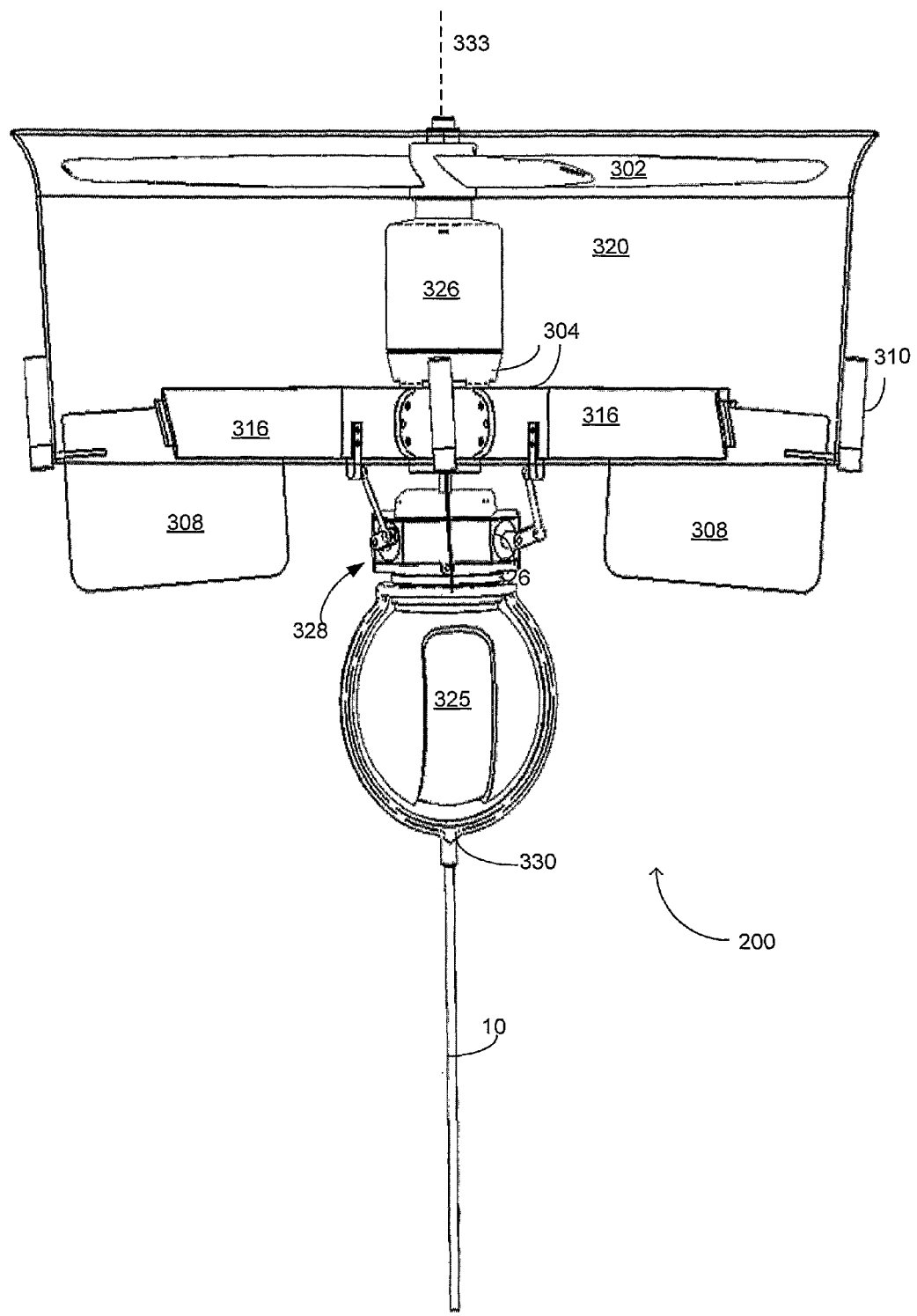
FIGS. 10-16 illustrate a floating unit according to various embodiments of the invention.
Figure 11:
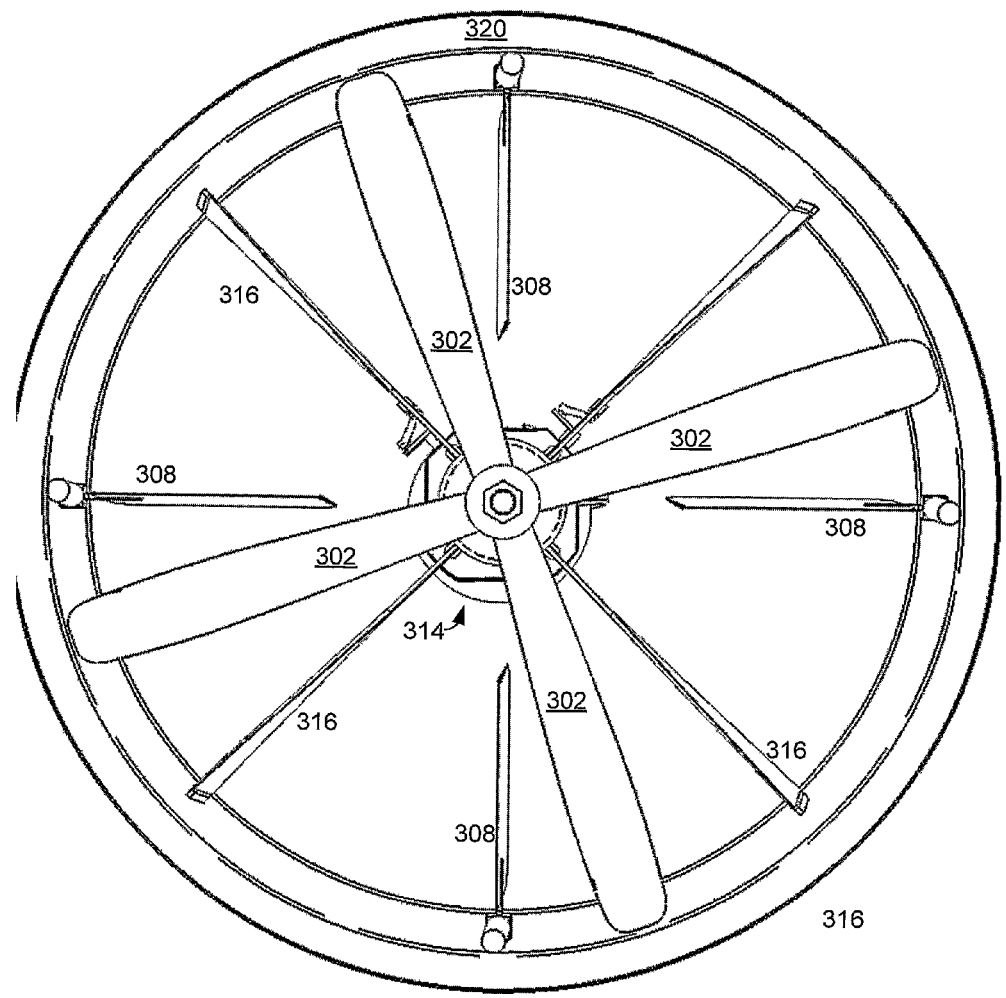
Figure 12:
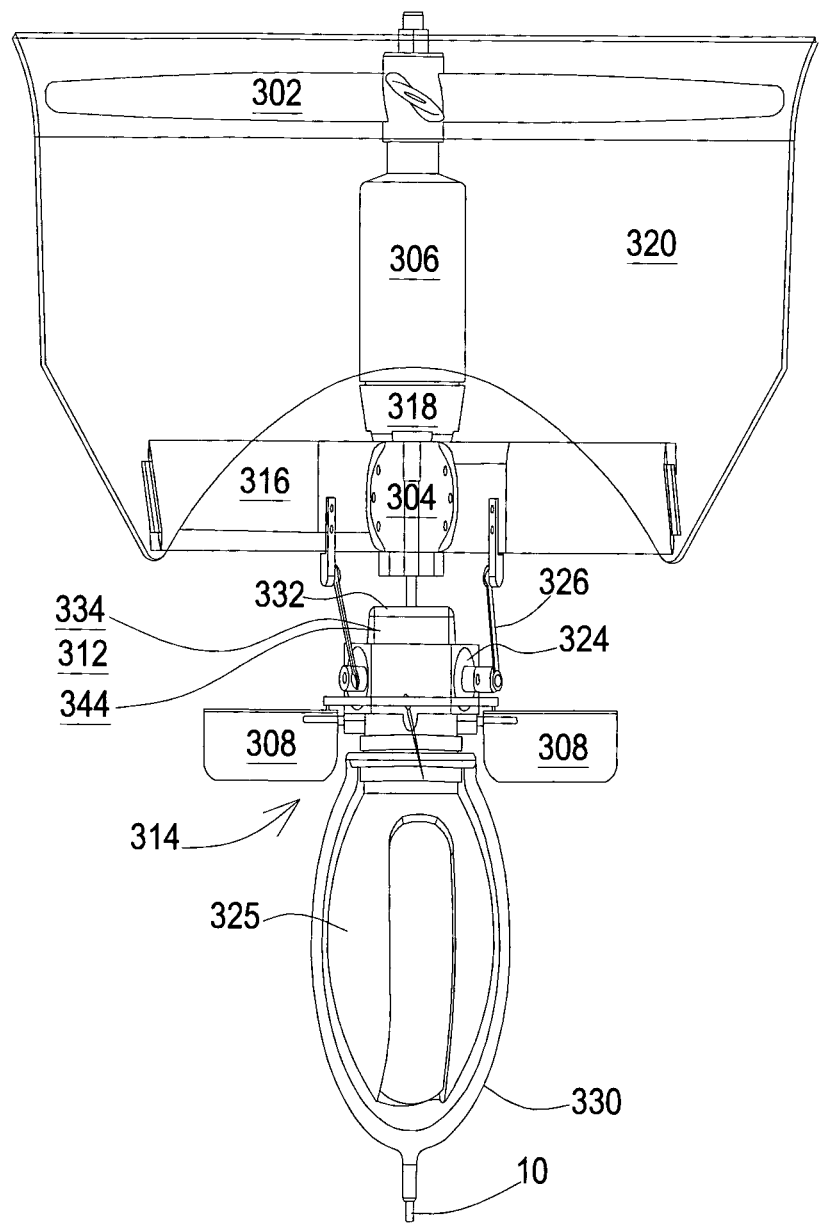
Figure 13:
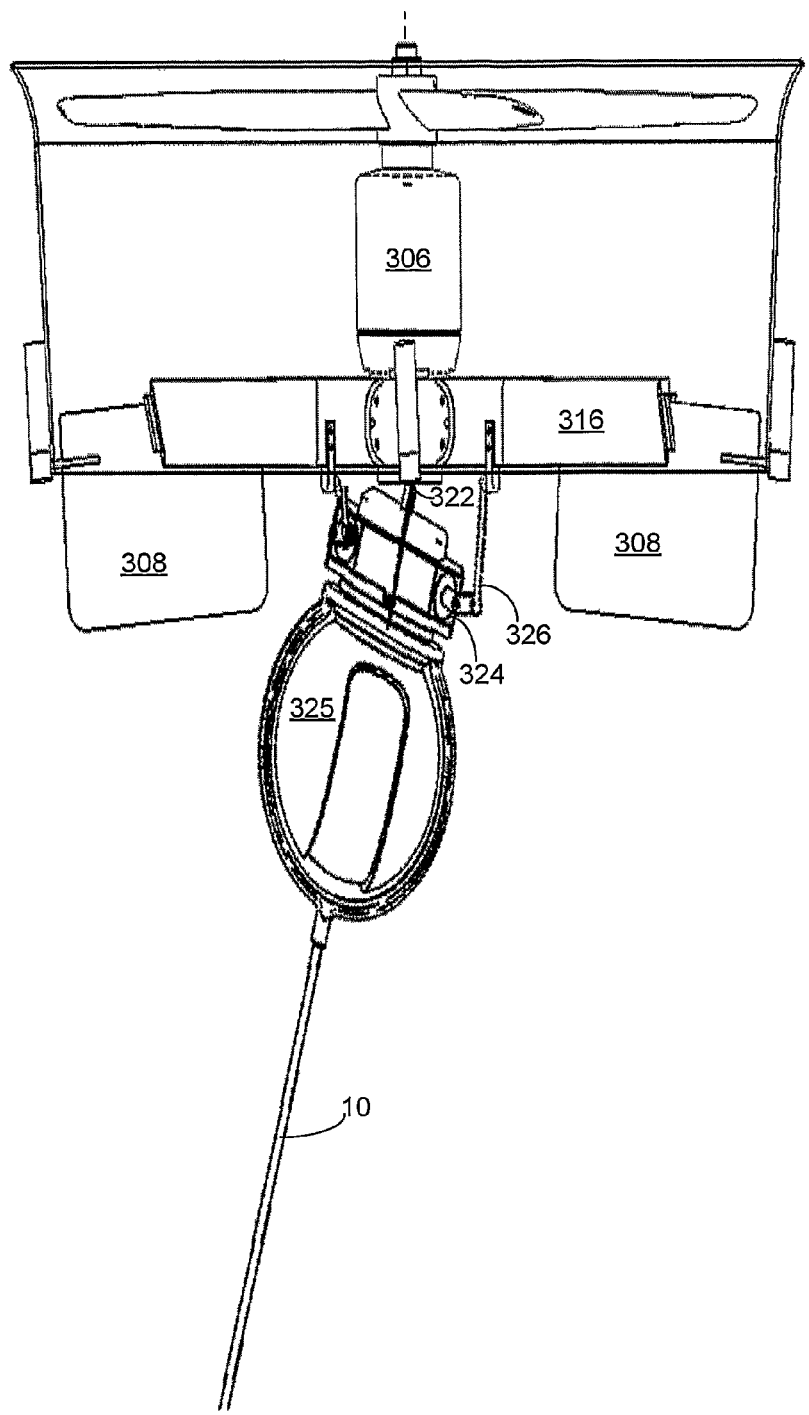

FIGS. 10, 12 and 13 are side views of floating unit 300 and payload 390 according to various embodiments of the invention. FIG. 11 is a top view of the floating unit 300 according to an embodiment of the invention. FIG. 13 is a three dimensional view of floating unit 300 according to an embodiment of the invention.

In FIGS. 10, 11, 13 and 14 floating unit 300 is illustrated as including movable steering elements 308 that are connected to a lower portion of annular housing 320. In FIG. 12 floating unit 300 is illustrated as including movable steering elements 308 that are connected to an interfacing unit 314 that is positioned below the annular housing 320.

In FIGS. 10-14 propeller 302 rotates about first axis 333. First axis 333 is not shown in some of these figures. In FIGS. 10, 11, 12 and 14 and the upper portion of flexible cable 10 is parallel to first axis 333. In FIG. 13 the upper portion flexible cable 10 is oriented in relation to first axis 333. The angular deviation is introduced by interfacing module 314.

For simplicity of explanation FIGS. 10-14 illustrate annular housing 320 of floating unit 200 as well as various components (such as propeller 230) that are located within the annular housing 320. It is noted that although FIGS. 10-15 illustrate an annular housing that the share of the annular housing may differ from a ring.

FIGS. 10-14 illustrate floating unit 300 as including propeller 302, frame 304, propeller motor 306, movable steering elements 308, movable steering element motors 310, controller 360, interfacing module 314 and fixed steering elements 316.

Frame 304 includes propeller motor support element 318 and multiple fixed steering elements 316 that connect the propeller motor support element 318 to annular housing 320. Propeller motor support element 318 is connected to the propeller motor 306.

Figure 14:
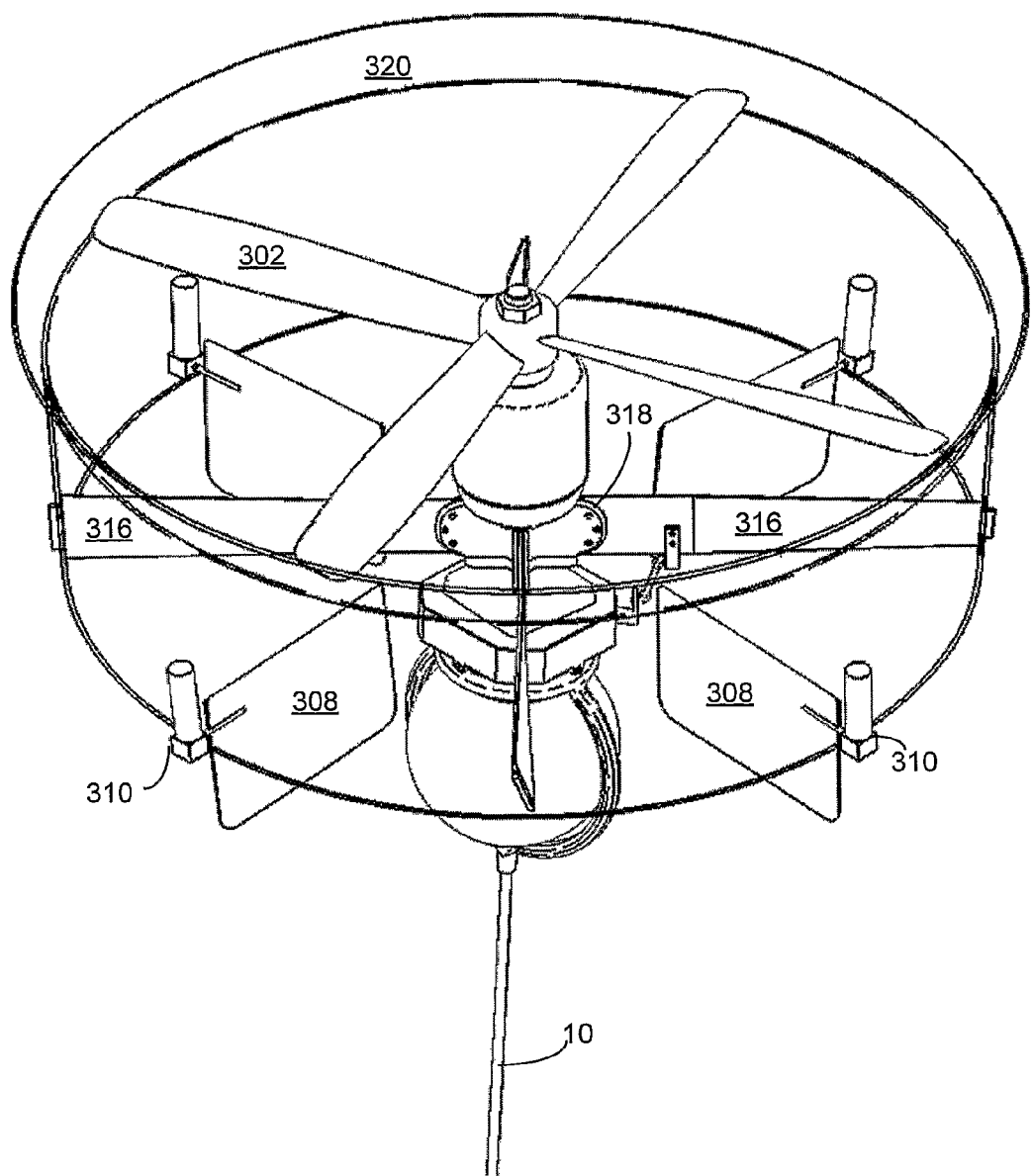

FIG. 14 illustrates movable steering element motors 310 that are located outside annular housing 320. It is noted that one or more movable steering element motor 310 can be located within annular housing 320.

FIGS. 10-14 illustrate annular housing 320 as surrounding propeller 302 but this is not necessarily so. Propeller 302 may be positioned above or below the annular housing 320.

Annular housing 320 may be made of (or be surrounded by) a thermal signature reduction material, a radiation absorbing material or both.

FIG. 11 illustrates multiple movable steering elements 308 that extend from annular housing 320 but do not reach a central region of the floating unit 200. It is, noted that these multiple movable steering elements 308 may be connected to propeller motor support element 318, to annular housing 302 or both or to any other part of frame 304. It is further noted that a shape, size or a location of one movable steering element may differ from those of another movable steering element.

FIG. 11 illustrates four movable steering elements 308 that extend from the annular housing 320 in a radial manner. The number of movable steering elements can exceed four or may be between one and four.

Although FIGS. 10-14 illustrate a single interfacing module 314 it is noted that floating unit 200 may include multiple interfacing modules. Additionally or alternatively, may include a payload interfacing module 328 for coupling payload to floating unit and a connecting element interfacing module 330 for receiving power from connecting element. Modules 328 and 330 may be integrated together, may located in separate locations, and the like. FIG. 10 illustrates modules 328 and 330 while FIGS. 11-14 include a general reference to interfacing module 314.

FIG. 13 illustrates an angular deviation introduced between connecting element 10 and floating unit 200.

Interfacing module 314 may be configured to introduce an angular deviation between an upper portion of the connecting element (such as flexible cable 10) and first axis 333.

Interfacing module 314 may include circular joint 322 that is connected between the upper portion of the connecting element 10 and frame 304, at least one interfacing module motor 324, and interfacing elements 326 (each interfacing element 326 may include a pair of bars that are pivotally connected to each other at one end and are connected to the interfacing module motor 324 and to the frame 304 on the other end), for converting at least one movement of the at least one interfacing module motor 324 to a relative movement between the upper portion of the connecting element 10 and frame 304.

Referring to FIG. 12, controller 312 as well as other electrical components may be located in various locations. For example, FIG. 12 illustrates housing 332 that belongs to interfacing module 314 that may surround various electronic components such as controller 312, orientation sensor 334, power distribution unit 336, communication unit 338 and the like. It is noted that various sensors (such as wind sensor and orientation sensor) may, be connected to other parts of the floating unit 200.

Orientation sensor 334 is configured to sense an orientation of floating unit 200. Multiple orientation sensors may be located in different locations to provide the orientation of floating unit 200 in relation to a plurality of axes.

Power distribution unit 336 may include a battery, power conversion elements, and various other electrical components for distributing the power supplied from flexible cable 10 to controller 312, power propeller motor 306 and may also filter the power, perform DC to DC, AC to DC, DC to AC conversions and the like.

Controller 312 may receive commands from ground unit via flexible cable and communication unit 338. These commands may specify a desired location and, additionally, a desired orientation of floating unit 200. These commands may also provide an indication about, an allowable deviation from the desired location and orientation.

Controller 312 may also receive orientation signals from orientation sensor 334, and wind direction and speed information (from ground unit 100) or from its own wind sensors (339) and determine how to control propeller motor 306, interfacing unit 314 and, additionally or alternatively, one or more of movable steering elements 308 in order to maintain floating unit 200 in a desired orientation and location.

Movable steering elements 308 and especially movable steering element motors 310 may be controlled by the controller 312, for compensating for fast changes in a location or of an orientation of the floating unit 200. For example, controller 312, may alter the angular, deviation of movable steering elements 308 in order to return floating unit 200 to a desired location.

According to an embodiment of the invention movable steering elements 308 may be used for compensating for propeller induced rotations and for other rotations or movements induced by the wind or other factors. Thus, controller 312 may set movable steering elements 308 to an initial position for preventing the floating unit 200 from rotating about first axis 333 as a result of a rotation of the propeller 302 at a fixed speed. Controller 312 may also move the movable steering elements 308 about the initial position for compensating for fast changes in a location or of an orientation of the floating unit 200.

Figure 16:
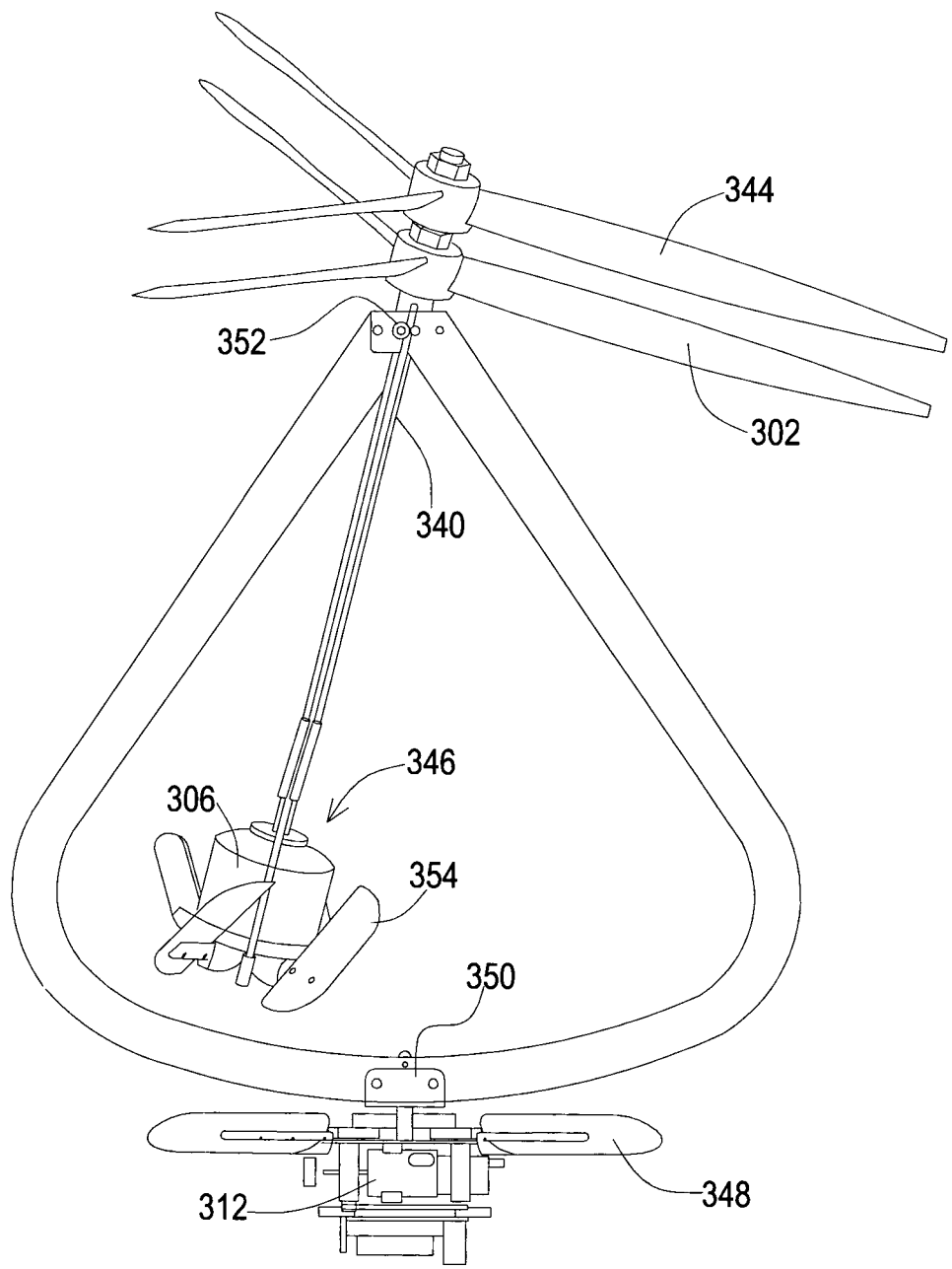
Figure 22:
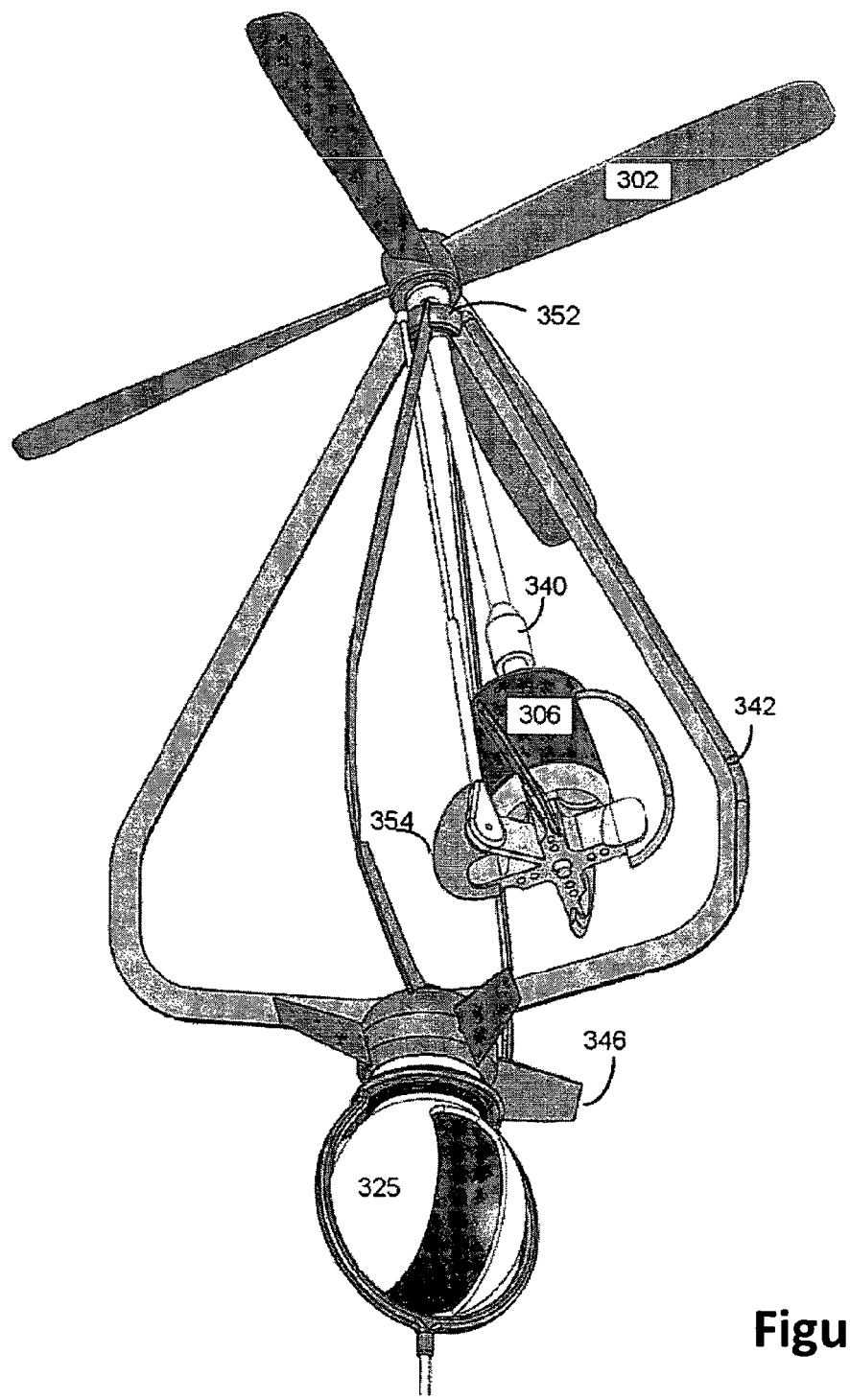

FIG. 16 illustrates a floating unit 200 that includes two frames, according to an embodiment of the invention. FIG. 22 illustrates a floating unit 200 that includes two frames, according to an embodiment of the invention.

FIG. 22 illustrates a single propeller 302 but the floating unit 200 of FIG. 22 may include a counter rotating element.

Floating unit 200 of FIG. 16 differs from those of FIGS. 10-14 by having multiple frames that facilitate a relative movement between propeller motor 306 and between a second frame 342 that is connected (via an interface) to the payload.

Floating unit 200 includes first propeller 302, first frame 340, second frame 342, a counter rotating element such as second propeller 344, rotation inducing module 346 that is configured to rotate the first propeller 302 about first axis 333 at a first direction and to rotate a counter rotating element such as second propeller 344 at a second direction that is opposite to the first direction. Rotation inducing module 346 is connected to first frame 340. It may include one or more engines.

Floating unit 200 may also include: (i) movable steering element 348 that is connected to second frame 342, (ii) a controller 312, for controlling at least one of the rotation inducing module 346 and the movable steering unit 348 to affect at least one of a location and an orientation of the floating unit 200; (iii) interlacing module 350 that is connected to second frame 342, and is arranged to connect a payload to the floating unit 200 and for receiving power from a connecting element (such as flexible cable 10), and (iv) a frame connecting module 352 that facilitates a relative movement between the first and second frames 340 and 342.

Floating unit 200 may also include fixed steering elements 354, connected to rotation inducing module 346, for reducing a rotation of the first frame 340 about first axis 333.

Frame connecting module 352 may allow both frames to move in relation to each other at two or more degrees of freedom. It facilitates a relative movement between the first and second frames 340 and 342 along two axes that are oriented in relation to the first axes. It may include a ring that is connected to second frame 342 via pins that are pivotally connected to second frame 342. The ring may be connected (for example by circular bearings) to the first frame 340.

It is noted that the location and, additionally or alternatively, the orientation of floating unit 200 may be further influenced by introducing openings in annular housing 320 and selectively opening these openings.

The location and, additionally or alternatively, the orientation of floating unit 200 may be affected by including additional propellers that may be a part of the floating unit 200.

It is noted that the floating unit of FIG. 16 can include one or more movable steering elements that are connected, to rotation inducing module 346, and additionally or alternatively, may include one or more fixed steering elements connected to second frame 342 (or interface 350).

FIGS. 15, 19, 20 and 21 illustrate a floating unit 200 according to another embodiment of the invention.

Figure 15:
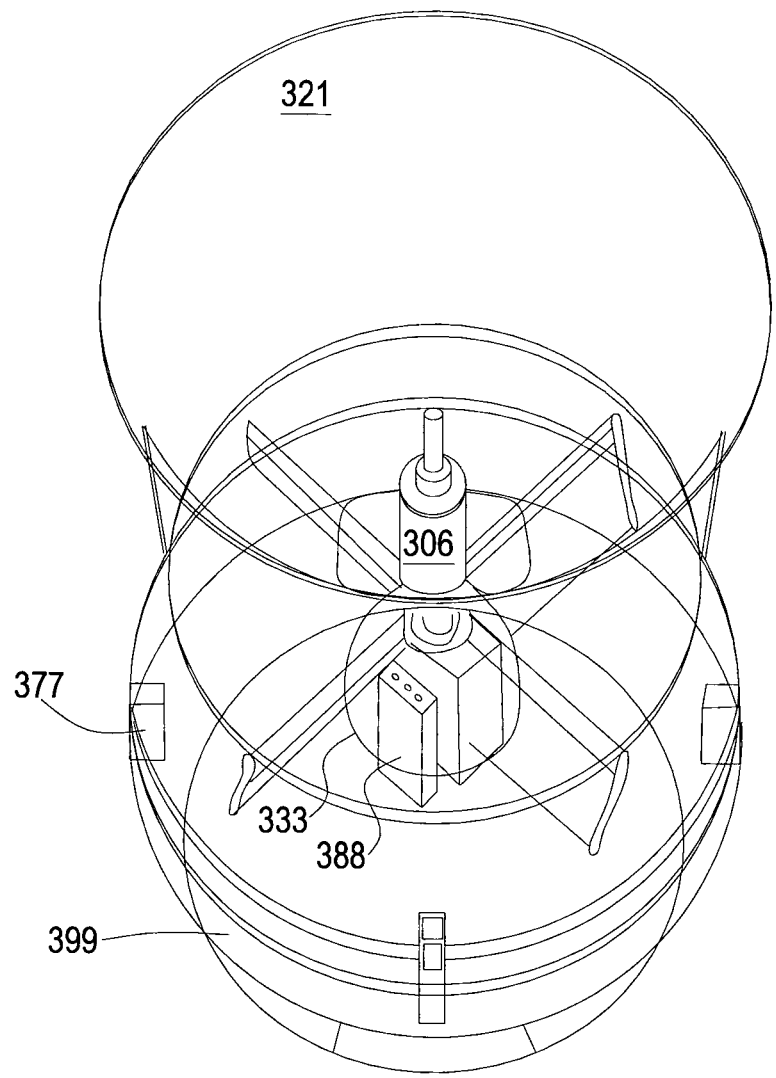
Figure 19:
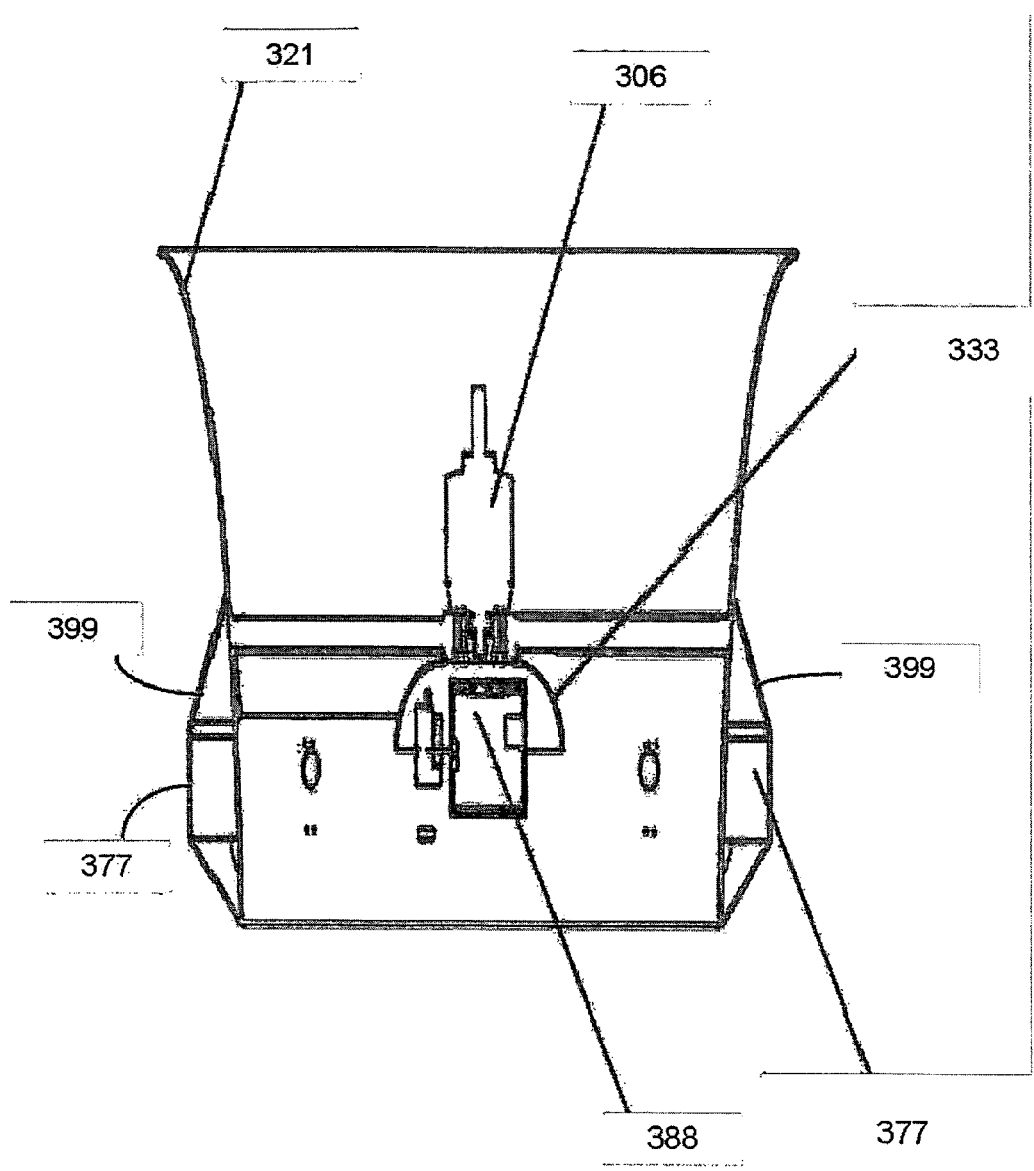
FIGS. 19-22 illustrate a floating unit according to various embodiments of the invention.
Figure 20:
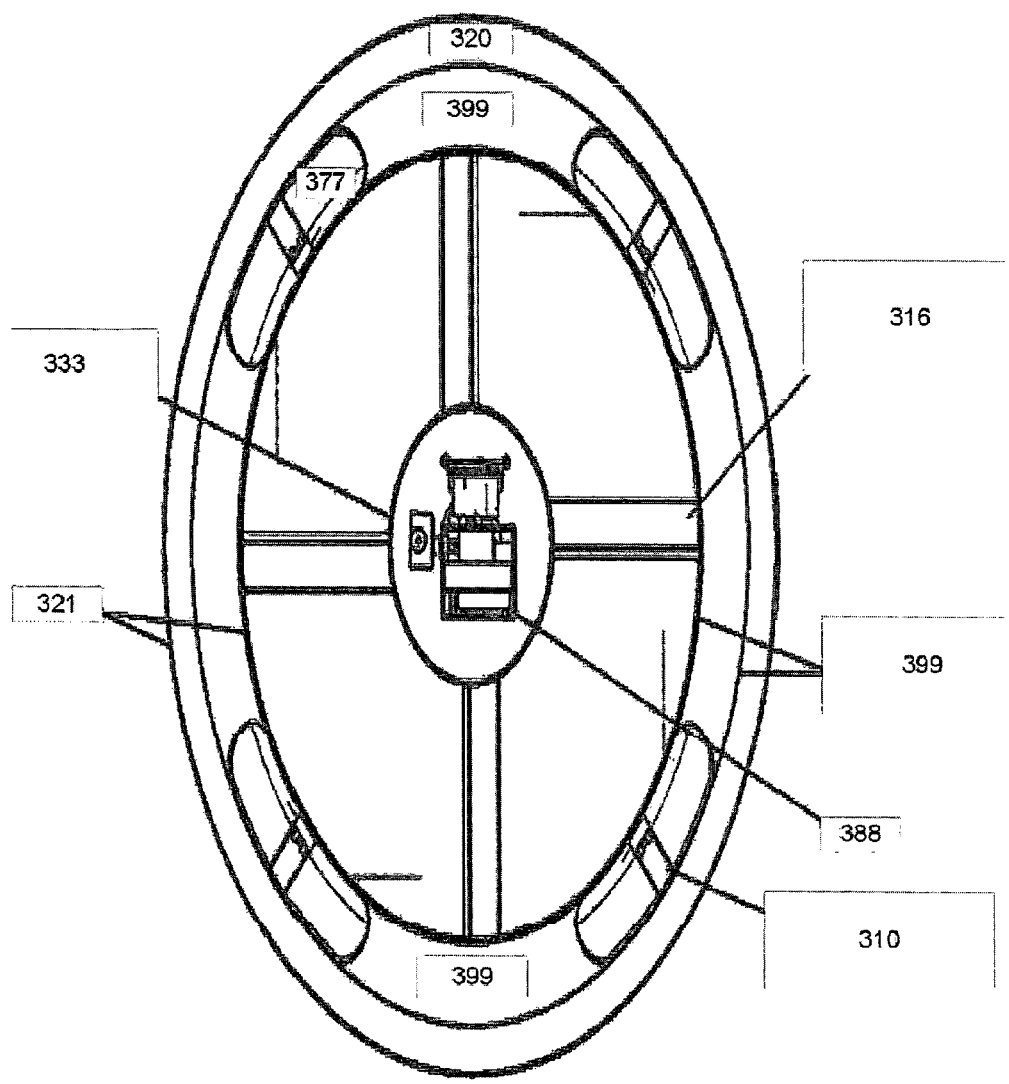
Figure 21:
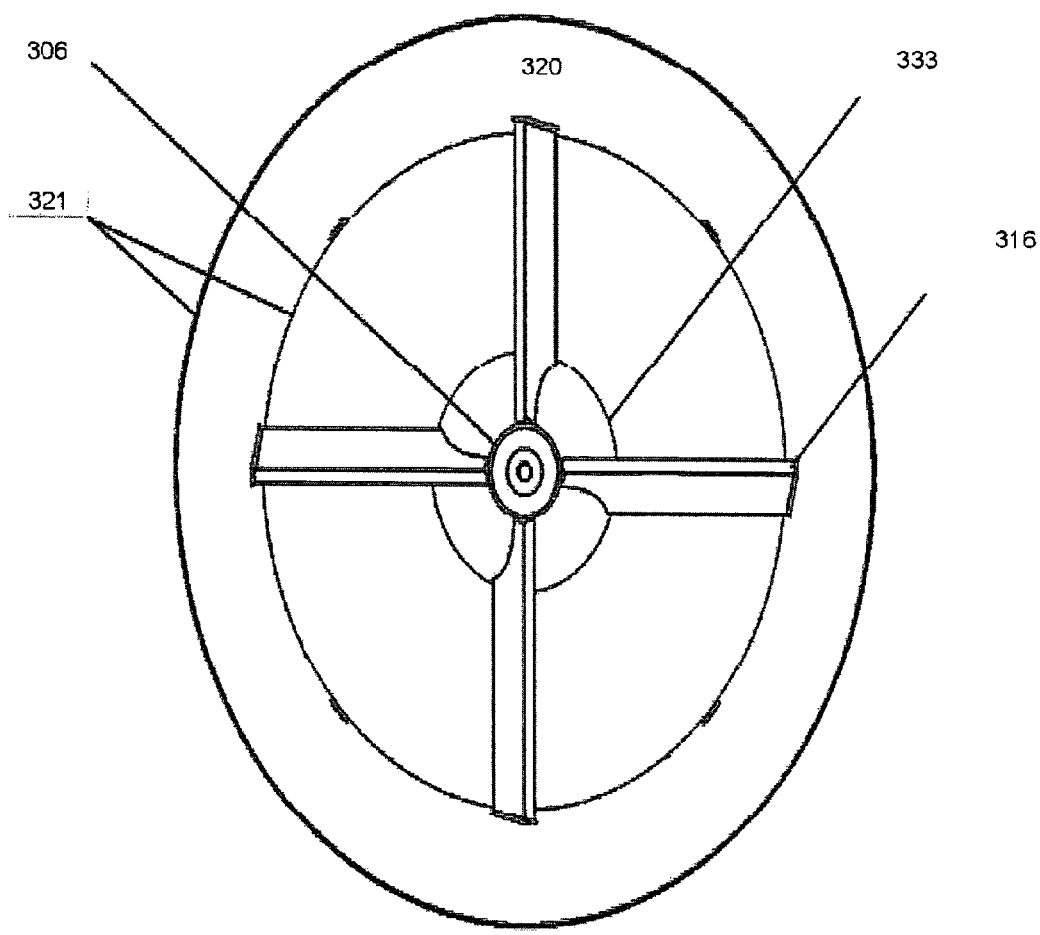

FIG. 15 is a perspective view of floating unit 200, FIG. 19 is a side view of floating unit 200, FIG. 20 is a bottom view of floating unit 200, and FIG. 21 is a top view of the floating unit 200.

The floating unit 200 of FIGS. 15, 19-21 includes a protective element such as dome 333 that is located below propeller motor 206 and partially surrounds electronic components 388. It protects the electronic components 388 and alters the flow or air near propeller motor 306. The electronic components 388 may include at least one of components 312, 334, 336, 338 and 339.

The floating unit 200 of FIGS. 15, 19-21 includes an annular housing 321. A lower portion of the annular housing 321 is surrounded by an additional structural element 377 may be opened and define one or more compartment in which payload may be inserted. The structural element may also define spaces 377 in which movable steering element motors 310 are located.

FIG. 17 illustrates method 1700 according to an embodiment of the invention.

Method 1700 may include various stages such as stages 1710, 1720, 1730 and 1740. These stages may be executed by floating unit 200 of any of the previous figures.

Stage 1710 includes receiving power from a connecting element that connects a floating unit to a ground unit.

Stage 1720 of distributing the power received by the power interface to a propeller motor of the floating unit and to a controller of the floating unit.

Stage 1730 of rotating a propeller of the floating unit about a first axis, by the propeller motor.

Stage 1740 of controlling, by the controller, at least one movable steering element out of the propeller motor and the movable steering unit to affect at least one of a location and an orientation of the floating unit.

Method 1700 may include at least one other stage such as stage 1750 of sensing an orientation of the floating unit, stage 1760 of receiving orientation and/or location commands from a ground unit.

In either case stage 1740 may include controlling the at least one movable steering element in response to the orientation of the floating unit.

Stage 1740 may include controlling the at least one movable steering element in response to a floating unit anti rotation affect introduced by a fixed steering element of the floating unit.

Method 1700 may include stage 1770 of introducing, by an interfacing module of the floating unit, an angular deviation between an upper portion of a tensed flexible cable and the first axis. This may be responsive to a command from ground unit or other source.

Stage 1740 may also include controlling the movable steering element for compensating for fast changes in a location or of an orientation of the floating unit.

Stage 1740 may also include, controlling including positioning the movable steering element at an initial position for preventing the floating element from rotating about the first axis as a result of a rotation of the propeller at a fixed speed and controlling the movable steering element about the initial position for compensating for fast changes in a location or of an orientation of the floating unit.

Stages 1710-1740 may be executed after the floating unit lifts itself by the rotation of the propeller. Accordingly, stages 1710-1740 may be executed during an elevation of the floating unit and even during the floating unit is being lowered towards the ground unit.

Assuming, for simplicity of explanation, that the floating unit is connected to a flexible cable that is being winded out and winded out then stage 1730 may include at least one of the following: (i) Rotating the propeller while the flexible cable is being winded up, (ii) Rotating the propeller at a fixed rotational speed, while the flexible cable is being winded up and while the tensed flexible cable is being winded out, (iii) Reducing a rotational speed of the propeller during a winding up the flexible cable, and (iv) altering a rotational speed of the propeller based on an proximity of the floating unit to the ground unit.

FIG. 18 illustrates method 1800 according to an embodiment of the invention. Method 1800 includes stages 1810, 1820 and 1830.

Stage 1810 includes increasing an effective length of a connecting element that connects a floating unit to a ground unit while a propeller motor of the floating unit rotates a propeller of the floating unit; wherein the effective length of the connecting element determines a distance between the floating unit and the ground unit. Stage 1820 includes supplying power to the floating unit via the connecting element, while the floating element is in the air. Stage 1830 includes reducing the effective length of the connecting element while the propeller motor of the floating unit rotates the propeller of the floating unit.

The connecting element may be a flexible cable and stage 1810 may include winding out the flexible cable while a propeller motor of the floating unit rotates a propeller of the floating unit. Stage 1830 may include winding up the flexible cable while the propeller motor of the floating unit rotates the propeller of the floating unit.

Method 1800 may include multiple repetitions of stage 1810-1830. It may include performing a sequence of winding up and winding out operations that result in changes in a length of a released portion of the flexible cable; wherein the changes in length are a fraction of the length of the released portion of the flexible cable. The sequence may reduce the chance of system resonance.

One or more methods are provided. They may include any combination or sub-combination of the stages listed in claims 34-43. One or more floating units are provided. They may include any combination or sub-combination of the elements listed in claims 1-21, 32-33 and 48-51. One or more systems are provided. They may include any combination or sub-combination of the elements listed in claims 22-31. One or more systems are provided. They may include a floating unit that may include any combination or sub-combination of the elements listed in claims 1-21, 32-33 and 48-51.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

We claim:

1. A floating unit, comprising:
   a propeller;
   a frame;
   a propeller motor that is configured to rotate the propeller about a first axis, where the propeller motor is coupled to the frame;
   a movable steering element;
   a controller, for controlling at least one of the propeller motor and the movable steering unit to affect at least one of a location and an orientation of the floating unit;
   an interfacing module for coupling a payload to the floating unit and for receiving power from a connecting element that couples the floating unit to a ground unit, the interfacing module being configured to introduce an angular deviation between an upper portion of the connecting element and the first axis, wherein the power received by the interfacing module is utilized to power the propeller motor and the controller, the interfacing module comprising:
   a circular joint coupled between the upper portion of the connecting element and the frame;
   at least one interfacing module motor;
   and interfacing elements, for converting at least one movement of the at least one interfacing module motor to a relative movement between the upper portion of the connecting element and the frame.

2. The floating unit according to claim 1 wherein the connecting element is a flexible cable that is maintained in a tensed status while the floating unit is in the air.

3. The floating unit according to claim 1, wherein the propeller motor is configured to rotate the propeller at a fixed speed; wherein the floating unit comprises at least one fixed steering element for preventing a rotation of the floating unit about the first axis as a result of a rotation of the propeller at the fixed speed.

4. The floating unit according to claim 1, wherein the floating unit comprises at least one fixed steering element for reducing a rotation of the floating unit about the first axis as a result of a rotation of the propeller.

5. The floating unit according to claim 1, wherein the frame comprises a propeller motor support element and multiple fixed steering elements that couple the propeller motor support element to an annular housing of the floating unit.

6. The floating unit according to claim 1, wherein the interfacing module comprises a lower end that interfaces the connecting element, a housing that is shaped to be connected to the payload and an upper end that comprises the at least one interfacing module motor.

7. The floating unit according to claim 1, wherein the frame comprises an annular housing that surrounds the propeller.

8. The floating unit according to claim 7, wherein the annular housing is surrounded by a thermal signature reduction material.

9. The floating unit according to claim 7, wherein the floating unit comprises multiple movable steering elements that extend from a central region of the floating unit towards the annular structural element.

10. The floating unit according to claim 7, wherein the multiple movable steering elements extend towards the annular structural element in a radial manner.

11. The floating unit according to claim 7, wherein at least one movable steering elements is connected to an inner portion of the annular housing.

12. The floating unit according to claim 1, wherein the interfacing module comprises a payload interfacing module for coupling the payload to the floating unit and a connecting element interfacing module for receiving power from the connecting element.

13. The floating unit according to claim 12, wherein the payload interfacing module is positioned below the propeller motor.

14. The floating unit according to claim 12, wherein the payload interfacing module is positioned above the propeller.

15. The floating unit according to claim 12, wherein the movable steering element is movable by a steering element motor that is located outside the annular housing.

16. The floating unit according to claim 1, comprising an orientation sensor for sensing an orientation of the floating unit.

17. The floating unit according to claim 1, wherein the movable steering element is configured to be controlled by the controller, for compensating for fast changes in a location or of an orientation of the floating unit.

18. The floating unit according to claim 1 wherein the controller is configured to position the movable steering element at an initial position for preventing the floating element from rotating about a floating unit axis as a result of a rotation of the propeller at a fixed speed; wherein the controller is further configured to move the movable steering element about the initial position for compensating for fast changes in a location or of an orientation of the floating unit.

19. A system, comprising:
a connecting element;
a ground unit comprising:
a power source for providing power to the flexible cable;
a connecting element manipulator, for altering an effective length of the connecting element, wherein the effective length of the connecting element defines a distance between the ground unit and a floating unit of the device;
a ground unit controller for controlling the connecting element manipulator;
a floating unit comprising:
a propeller;
a frame;
a propeller motor that is configured to rotate the propeller about a first axis, wherein the propeller motor is coupled to the frame;
a movable steering element;
a controller for controlling at least one of the propeller motor and the movable steering element to affect at least one of a location and an orientation of the floating unit;
and an interfacing module for coupling a payload to the floating unit and for receiving power from the connecting element, wherein the power received by the interfacing module is utilized to power the propeller motor and the controller, the interfacing module comprising:
a circular joint coupled between the upper portion of the connecting element and the frame;
at least one interfacing module motor;
and interfacing elements, for converting at least one movement of the at least one interfacing module motor to a relative movement between the upper portion of the connecting element and the frame.

20. The system according to claim 19 wherein the connecting element is a flexible cable and wherein the connecting element manipulator is configured to wind up and wind out the flexible cable; wherein while the floating unit is in the air the flexible cable is maintained in a tensed status.

21. The system according to claim 20, wherein connecting element manipulator is configured to perform a sequence of winding up and winding out operations that result in changes in an effective length of the flexible cable; wherein the changes in length are a fraction of the effective length of the flexible cable.

22. The system according to claim 20, wherein the flexible cable is coupled to the flexible cable interface by a shock constraining element.

23. The system according to claim 20, wherein the flexible cable has a wing cross section.

24. The system according to claim 20, wherein the propeller motor is configured to rotate the propeller while the floating unit is being winded up.

25. The system according to claim 20, wherein the propeller motor is configured to rotate the propeller at a fixed speed during the winding up and the winding out of the flexible cable.

26. The system according to claim 20, wherein the propeller motor is configured to reduce a rotational speed of the propeller during a winding up the flexible cable.

27. The system according to claim 20, wherein the propeller motor is configured to alter a rotational speed of the propeller based on the effective length of the flexible cable.

28. The system according to claim 19, wherein the ground unit is mounted to a vehicle.

29. A floating unit, comprising:
a frame;
a propeller;
a propeller motor that is coupled to the frame and is configured to rotate the propeller at a fixed speed about a first axis;
a payload interfacing module, for coupling a payload to the floating unit; a controller;
at least one fixed steering element for preventing the floating element from rotating about the first axis as a result of a rotation of the propeller at the fixed speed;
at least one movable steering element, controlled by the controller, for compensating for fast changes in a location or in an orientation of the floating unit;
a cable interfacing module for receiving power from a tensed flexible cable that couples the floating unit to a ground unit, wherein the power received by the interfacing module is utilized to power the propeller motor and the controller, the interfacing module comprising:
a circular joint coupled between the upper portion of the connecting element and the frame;
at least one interfacing module motor;
and interfacing elements, for converting at least one movement of the at least one interfacing module motor to a relative movement between the upper portion of the flexible cable and the frame.

30. A floating unit, comprising:
a propeller;
a propeller motor that is configured to rotate the propeller, wherein the propeller motor receives power generated by a ground unit;
a payload interface, for coupling a payload to the floating unit;
a movable steering element;
a controller, for controlling the movable steering unit and for controlling the propeller motor;
a cable interfacing module for introducing an angular deviation between an upper portion of a tensed flexible cable and the first axis, wherein the tensed cable couples the floating unit to a ground unit, the interfacing module comprising:
a circular joint coupled between the upper portion of the connecting element and the frame of the floating unit;
at least one interfacing module motor;
and interfacing elements, for converting at least one movement of the at least one interfacing module motor to a relative movement between the upper portion of the tensed flexible cable and the frame of the floating unit.

31. A method for operating a floating unit, the method comprising:
receiving power from a connecting element that couples the floating unit to a ground unit;

distributing the power received by a power interface to a propeller motor of the floating unit and to a controller of the floating unit;

rotating a propeller of the floating unit about a first axis, by the propeller motor;

controlling, by a controller, at least one movable steering element out of the propeller motor and a movable steering unit to affect at least one of a location and an orientation of the floating unit;

introducing an angular deviation between an upper portion of the connecting element and the first axis, by an interfacing module comprising a circular joint coupled between the upper portion of the connecting element and the frame of the floating unit, at least one interfacing module motor, and interfacing elements, for converting at least one movement of the at least one interfacing module motor to a relative movement between the upper portion of the connecting element and the frame of the floating unit.

32. The method according to claim 31, comprising sensing an orientation of the floating unit and controlling the at least one movable steering element in response to the orientation of the floating unit.

33. The method according to claim 31, comprising controlling the at least one movable steering element in response to a floating unit anti rotation affect introduced by a fixed steering element of the floating unit.

34. The method according to claim 31, further comprising introducing, by an interfacing module of the floating unit, an angular deviation between an upper portion of a tensed flexible cable and the first axis.

35. The method according to claim 31, comprising controlling the movable steering element for compensating for fast changes in a location or of an orientation of the floating unit.

36. The method according to claim 31, comprising positioning the movable steering element at an initial position for preventing the floating element from rotating about the first axis as a result of a rotation of the propeller at a fixed speed and controlling the movable steering element about the initial position for compensating for fast changes in a location or of an orientation of the floating unit.

37. The method according to claim 31, wherein the connecting element is a flexible cable that is maintained in a tensed position while the floating unit is in the air.

38. The method according to claim 37, comprising rotating the propeller while the flexible cable is being winded up.

39. The method according to claim 37, comprising rotating the propeller at a fixed rotational speed, while the flexible cable is being winded up and while the tensed flexible cable is being winded out.

40. The method according to claim 37, comprising reducing a rotational speed of the propeller during a winding up the flexible cable.

41. The system according to claim 37, comprising altering a rotational speed of the propeller based on an proximity of the floating unit to the ground unit.

42. A method, comprising:

increasing an effective length of a connecting element that connects a floating unit to a ground unit while a propeller motor of the floating unit rotates a propeller of the floating unit about a first axis, wherein the effective length of the connecting element determines a distance between the floating unit and the ground unit;

supplying power to the floating unit via the connecting element while the floating element is in the air;

reducing the effective length of the connecting element while the propeller motor of the floating unit rotates the propeller of the floating unit;

introducing an angular deviation between an upper portion of the connecting element and the first axis, by an interfacing module comprising a circular joint coupled between the upper portion of the connecting element and the frame of the floating unit, at least one interfacing module motor, and interfacing elements for converting at least one movement of the at least one interfacing module motor to a relative movement between the upper portion of the connecting element and the frame of the floating unit.

43. The method according to claim 42, wherein the connecting element is a flexible cable; wherein the increasing comprises winding out the flexible cable while a propeller motor of the floating unit rotates a propeller of the floating unit; and wherein the decreasing comprises winding up the flexible cable while the propeller motor of the floating unit rotates the propeller of the floating unit.

44. The method according to claim 43, comprising performing a sequence of winding up and winding out operations that result in changes in a length of a released portion of the flexible cable; wherein the changes in length are a fraction of the length of the released portion of the flexible cable.

* * * * *